(12) United States Patent
Matsumoto et al.

(10) Patent No.: US 8,667,030 B2
(45) Date of Patent: Mar. 4, 2014

(54) STORAGE SYSTEM AND MANAGEMENT METHOD OF FILE SYSTEM USING THE STORAGE SYSTEM

(75) Inventors: Shinya Matsumoto, Yokohama (JP); Takahiro Nakano, Yokohama (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 982 days.

(21) Appl. No.: 12/342,099

(22) Filed: Dec. 23, 2008

(65) Prior Publication Data
US 2010/0121892 A1      May 13, 2010

(30) Foreign Application Priority Data
Nov. 7, 2008   (JP) .................................. 2008-286560

(51) Int. Cl.
*G06F 12/00*  (2006.01)
*G06F 17/30*  (2006.01)
*G06F 13/00*  (2006.01)
*G06F 13/28*  (2006.01)

(52) U.S. Cl.
USPC .......................................... 707/823; 711/114

(58) Field of Classification Search
USPC .................... 707/821, 823; 711/114
See application file for complete search history.

(56) References Cited

U.S. PATENT DOCUMENTS

| | | | |
|---|---|---|---|
| 6,526,478 B1 * | 2/2003 | Kirby | 711/114 |
| 6,640,278 B1 * | 10/2003 | Nolan et al. | 711/6 |
| 6,968,451 B2 * | 11/2005 | Neuman | 713/1 |
| 7,469,315 B2 * | 12/2008 | Watanabe et al. | 711/114 |
| 7,516,348 B1 * | 4/2009 | Ofer | 713/324 |
| 2007/0061509 A1 * | 3/2007 | Ahluwalia et al. | 711/112 |
| 2008/0126701 A1 | 5/2008 | Uehara et al. | |
| 2008/0270696 A1 * | 10/2008 | Murayama et al. | 711/114 |
| 2009/0083558 A1 * | 3/2009 | Sugiki et al. | 713/320 |
| 2009/0177836 A1 * | 7/2009 | Mimatsu | 711/111 |
| 2009/0265519 A1 * | 10/2009 | Moore et al. | 711/162 |
| 2009/0271657 A1 * | 10/2009 | McCombs et al. | 714/6 |
| 2010/0070731 A1 * | 3/2010 | Mizuno et al. | 711/170 |

FOREIGN PATENT DOCUMENTS

JP      2008-134830      6/2008

* cited by examiner

*Primary Examiner* — Brannon W Smith
(74) *Attorney, Agent, or Firm* — Brundidge & Stanger, P.C.

(57) ABSTRACT

When a management screen for conducting management operation of a file system in the NAS apparatus 10 of a file server is displayed by the administrator on a display device of the management console 30 by using the management console 30, if a disk device obtained from the storage apparatus 20 is in a power saving state, the NAS apparatus 10 has a function to change the operations hereafter. Specifically, a screen is displayed on the management screen, in which a creation or deletion of the file system becomes impossible with respect to the disk device in the power saving state. Therefore, the administrator can conduct management operations for services without referring to the power status, thereby resulting in easy management operation.

15 Claims, 18 Drawing Sheets

1407 LU management table

| LUN (14071) | LU名 (14072) | Utilization status (14073) |
|---|---|---|
| 0 | lu00 | In-use |
| 1 | lu01 | In-use |
| 2 | lu02 | In-use |
| 3 | lu03 | In-use |
| 4 | lu04 | Not in-use |
| 5 | lu05 | Not in-use |
| 6 | lu06 | Not in-use |
| 7 | lu07 | Not in-use |
| 8 | lu08 | Not in-use |
| 9 | lu09 | Not in-use |
| 10 | lu10 | Not in-use |
| ⋮ | ⋮ | ⋮ |

FIG. 6

1407 LU management table

| LUN (14071) | LU名 (14072) | Utilization status (14073) |
|---|---|---|
| 0 | lu00 | In-use |
| 1 | lu01 | In-use |
| 2 | lu02 | In-use |
| 3 | lu03 | In-use |
| 4 | lu04 | Not in-use |
| 5 | lu05 | Not in-use |
| 6 | lu06 | Not in-use |
| 7 | lu07 | Not in-use |
| 8 | lu08 | Not in-use |
| 9 | lu09 | Not in-use |
| 10 | lu10 | Not in-use |
| ⋮ | ⋮ | ⋮ |

FIG. 7

1408 File system management table

| File system ID (14081) | File system name (14082) | Constituent LUN (14083) |
|---|---|---|
| 0 | fs00 | 0 |
| 1 | fs01 | 1 |
| 2 | fs01 | 2 |
| 3 | fs03 | 3 |

FIG. 8

243 RG-LU management table

| RG ID | Storage LUN | Host LUN | Power status |
|---|---|---|---|
| 0 | 0 | 0 | Spin-up |
| 1 | 1 | 1 | Spin-down |
| 2 | 2 | 2 | Spin-down reserve |
| 2 | 3 | 3 | Spin-up |
| 3 | 4 | 4 | Spin-up |
| 4 | 5 | 5 | Spin-down |
| 5 | 6 | 6 | Spin-down |
| 6 | 7 | 7 | Spin-down |
| 6 | 8 | 8 | Spin-down |
| 6 | 9 | 9 | Spin-down |
| 6 | 10 | 10 | Spin-down |
| ⋮ | ⋮ | ⋮ | ⋮ |

1410 Delay execution management table

| Job ID | LUN | Writing address | Writing content data |
|---|---|---|---|
| 0 | 4 | 1000 | 10 |
| 1 | 4 | 2000 | 20 |
| 2 | 5 | 1000 | 10 |

14101　14102　14103　14104

STORAGE SYSTEM AND MANAGEMENT METHOD OF FILE SYSTEM USING THE STORAGE SYSTEM

INCORPORATION BY REFERENCE

This application relates to and claims priority from Japanese Patent Application No. 2008-286560 filed on Nov. 7, 2008, the entire disclosure of which is incorporated herein by reference.

BACKGROUND OF THE INVENTION

1. Field of the Invention

The present invention relates to a management technology of a storage system provided with a power saving function of a physical storage device, and more particularly to the technology for simplifying a management operation.

2. Description of the Related Art

A storage apparatus provided with a plurality of physical storage devices has been known. For example, as seen in a disk array apparatus which is equipped with a plurality of disk devices provided with a rotating disk in the physical storage device, the storage apparatus consumes a large amount of electric power among information equipments. Therefore, a technology for saving electric power of the disk array apparatus has been developed, which is, for example, disclosed in Japanese Patent Laid-Open Publication No. 2008-134830.

According to the disclosure of the Japanese Patent Laid-Open Publication No. 2008-134830, in the storage system consist of the storage apparatus and management console, the administrator controls a power status of the disk device using the management console to save the electric power of the storage apparatus. Here, the power status means an operation status from power saving point of view of the disk. A spin-up and a spin-down are examples of the power status. The spin-up indicates a fast rotation state of the disk, and is capable of receiving an input/output processing such as read processing and write processing. However, the spin-up consumes a large amount of electric power. The spin-down indicates a slow rotation state of the disk, and is not capable of receiving the input/output processing such as the read processing and write processing. However, the spin-down consumes a small amount of electric power.

The disk device in a power saving state of the power status does not execute the input/output processing such as the read processing and write processing. The power saving state may include, for example, a power-off state and a rotation stop state of the disk, as well as the spin-down.

Meanwhile, a file server which provides a service capable of accessing a file as a unit is known. The file server stores a file system for managing the file in the physical storage device of the storage apparatus and provides a computer with a service such as a file access service and the like using the file system.

The administrator is required to conduct various kinds of management operations including, for example, a creation and deletion of the file system, for providing the file access service. The administrator may access to the physical storage device in the management operation in some case.

SUMMARY OF THE INVENTION

For achieving a management function of the file server and the power saving function of the storage apparatus, management information required for each of the functions is stored in the file server and the storage apparatus, respectively. Therefore, the administrator first checks the power status of a disk device which is a target of management operation, then conducts the management operation to access to the disk device so that the management operation of a service of the file server goes well. However, since the administrator is required to check the status of the disk device to be accessed for each management operation, the management operation becomes troublesome. In other words, for achieving the creation and deletion of a file system, the disk device which is not in the power saving state must be accessed. However, a checking operation for checking in advance the power status of the disk device constituting the storage apparatus is required for each management operation. If the disk device under power saving state is accessed for executing creation and deletion of the file system, the management operation will fail.

It is, therefore, an object of the present invention to eliminate a checking operation of a power status of a disk device by an administrator, which is required in a power saving state of the disk device, to simplify a management operation.

To achieve the object described above, if the disk device obtained from the storage apparatus is displayed to be in the power saving state on the management screen with which the administrator conducts management operation of the file server, the file server has a function to change the operations hereafter. Specifically, a screen is displayed on the management screen, in which a creation or deletion of the file system becomes impossible with respect to the disk device in the power saving state.

Therefore, the administrator can conduct management operations for services without referring to the management screen of the power status, and can be prevented from failing of the management operation caused by selecting the disk device in the power saving state, thereby resulting in easy management operation of the administrator.

According to the present invention, the management operation can be simplified by eliminating the checking work of the power status by the administrator, which is required in the power saving state of the disk device.

BRIEF DESCRIPTION OF THE DRAWINGS

FIG. 6 is an illustration for explaining a configuration of a LU management table according to the first embodiment of the present invention;

FIG. 7 is an illustration for explaining a configuration of a file system management table according to the first embodiment of the present invention;

FIG. 8 is an illustration for explaining a configuration of a RG-LU management table according to the first embodiment of the present invention;

FIG. 15 is an example of a file system creation screen of a management console according to the first embodiment of the present invention;

FIG. 20 is an illustration for explaining a configuration of a delay execution management table according to a second embodiment of the present invention;

PREFERRED EMBODIMENTS OF THE PRESENT INVENTION

Hereinafter, embodiments of the present invention will be explained by referring to drawings. It in noted that the present invention is not limited to the embodiments to be described hereinafter.

<<First Embodiment>>

Figure 1:
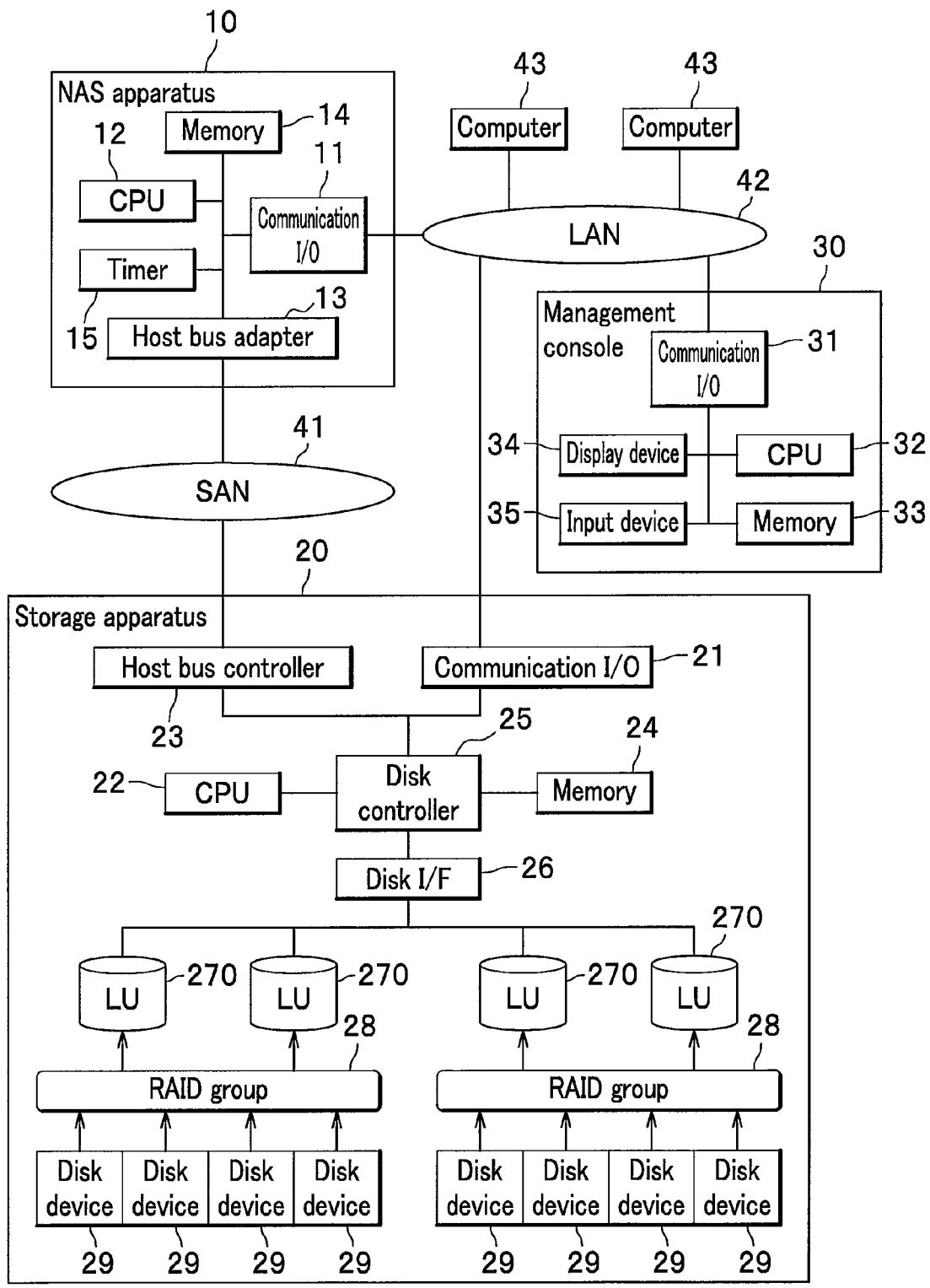
FIG. 1 is an illustration for explaining a configuration example of a whole storage system according to a first embodiment of the present invention.

FIG. 1 is an illustration for explaining a configuration example of a whole storage system according to a first embodiment of the present invention.

A NAS (Network Attached Storage) apparatus 10 is connected to a storage apparatus 20 through a SAN (Storage Area Network) 41, and connected to the storage apparatus 20, a management console (management computer) 30, and a computer 43 through a LAN (Local Area Network) 42.

The NAS apparatus 10 is a file server and includes a communication I/F (Interface) 11, a CPU (Central Processing Unit: control unit for file server) 12, a host bus adaptor 13, a memory (storage unit for file server) 14, and a timer 15. The memory 14 stores programs and data for executing a predetermined processing. The CPU 12 executes the programs stored in the memory 14. The communication I/F 11 executes communications described next with the storage apparatus 20, the management console 30, and the computer 43 mainly through the LAN 42. The communication I/F 11 executes communications with the storage apparatus 20 and the management console 30 mainly for the management. The communication I/F 11 executes communications with the NAS apparatus 10 and the computer 43 mainly for a file access service. The host bus adaptor 13 executes a communication of a data block and a communication for controlling a power saving function of the disk device with the storage apparatus 20 mainly through the SAN 41. The timer 15 has information of time.

The storage apparatus 20 is an apparatus for storing data of a connected host (NAS apparatus 10), and includes a communication I/F 21, a CPU (control unit for storage apparatus) 22, a host bus controller 23, a memory (storage unit for storage apparatus) 24, a disk controller 25, a disk I/F 26, and a disk device (physical storage device) 29. The memory 24 stores programs and data for executing predetermined processing. The CPU 22 executes the programs stored in the memory 24. The communication I/F 21 executes communications for management with the NAS apparatus 10 and the management console 30 mainly through the LAN 42. The host bus controller 23 executes a communication of a data block and a communication for controlling a power saving function of the disk with the NAS apparatus 10 mainly through the SAN 41. The disk controller 25 is connected to the disk device 29 through the disk I/F 26, and interfaces with the disk device 29 regarding input/output processing (I/O processing) such as write processing and read processing to and from the disk device 29.

The storage apparatus 20 includes a plurality of disk devices 29. In the embodiment, the plurality of the disk devices 29 constitute RAID (Redundant Arrays of Independent Disks) groups 28. The storage apparatus 20 generates a LU (Logical Unit: Logical Volume) 270 by utilizing a part of storage area of the RAID groups 28 and provides it to an external apparatus.

The management console 30 includes a communication I/F 31, a CPU (control unit for management computer) 32, a memory (storage unit for management computer) 33, a display device (display device for management computer) 34 such as a display, and an input device 35 such as a mouse and keyboard. The communication I/F 31 executes communications with the NAS apparatus 10 and storage apparatus 20 mainly for the management operation through the LAN 42. The memory 33 stores programs and data for executing predetermined processing. The CPU 32 executes the programs stored in the memory 33.

The computer 43 executes programs in a memory not shown by a CPU not shown and transmits a file access request (mainly, read processing request and write processing request) to the NAS apparatus 10.

The NAS apparatus 10, the storage apparatus 20, the management console 30 and the computer 43 are computers provided with hardware such as an input unit, a display device, a control unit and a storage unit.

The features described above are the configuration example of a whole storage system.

Next, an operation summary of the storage system according to the first embodiment of the present invention will be explained.

In the embodiment, an example which utilizes the present invention will be explained by exemplifying a display content on a management screen (screen displayed in display device 34) in the case of creation and deletion of a file system in a storage system which is provided with a power saving function.

Figure 2:
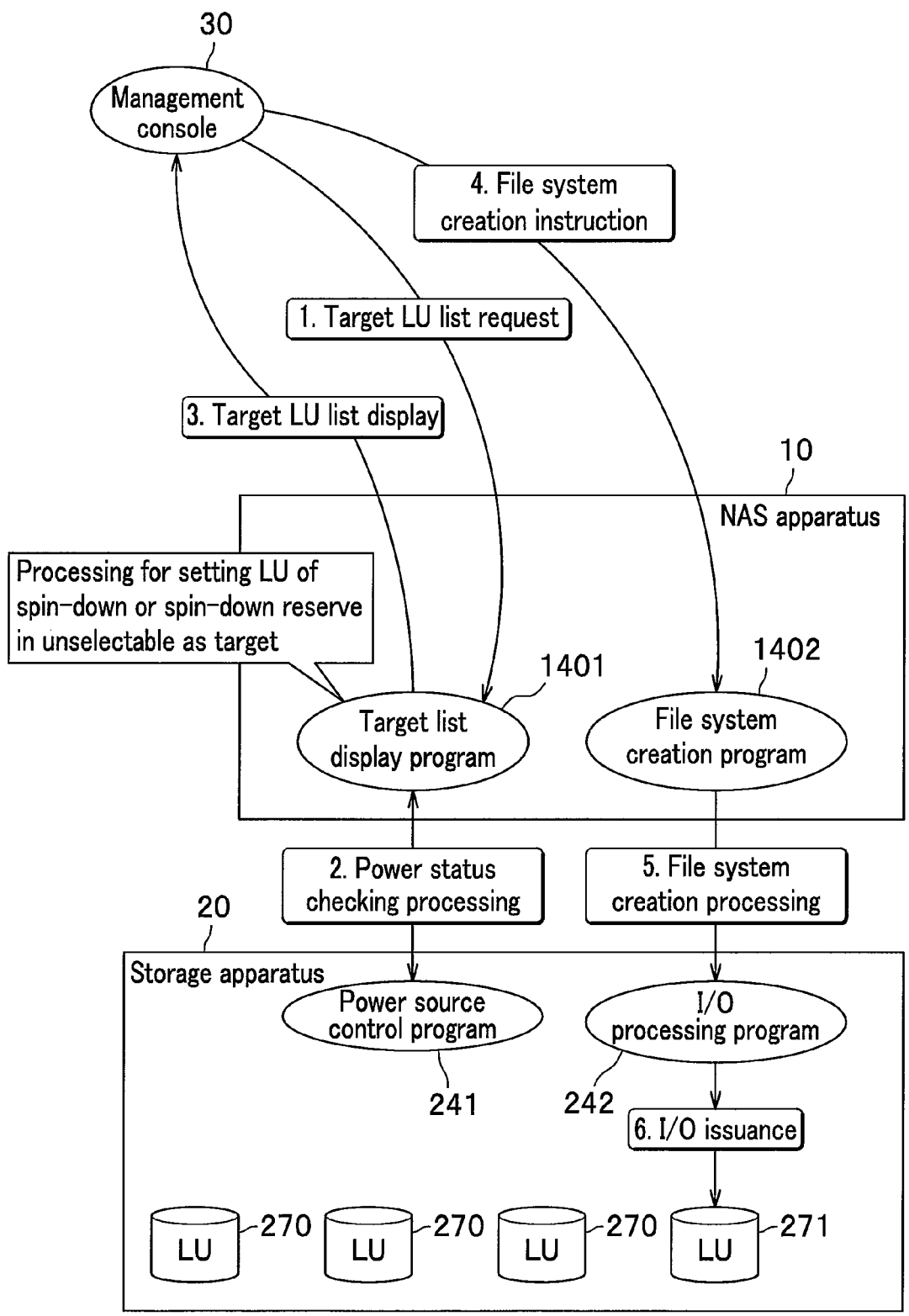
FIG. 2 is an illustration for explaining an operation summary of a storage system according to the first embodiment of the present invention.

FIG. 2 is an illustration for explaining an operation summary of a storage system according to the first embodiment of the present invention.

The administrator creates a file system according to the following procedure.

The administrator requests a list of LU 270 which is a target of file system creation to the NAS apparatus 10 ("1. target LU list request" in FIG. 2).

If the NAS apparatus 10 receives the target LU list request, the NAS apparatus 10 and the storage apparatus 20 execute a power status checking processing of the LU 270 ("2. power status checking processing" in FIG. 2). Here, the power status checking processing has the following two processings. As a first processing, a target list display program 1401 transmits a power status checking request of the LU 270 to a power source control program 241. If the power source control program 241 receives the power status checking request, the power source control program 241 transmits the power status of the LU 270 to the target list display program 1401 as a second processing.

When the power status checking processing is completed and if the NAS apparatus 10 receives a power status of each of the LU 270, the target list display program 1401 prevents a LU, whose power status is spin-down or spin-down reserve among the LU 270, from being selected from the input device 35, and displays a target LU list in the display device 34 of the management console 30 ("3. target LU list display" in FIG. 2). The spin-down reserve will be explained later in details.

The administrator selects a LU 270 from the displayed target LU list (selected LU is described as LU 271), and transmits instruction for requesting a file system creation to the NAS apparatus 10 from the management console 30.

If the NAS apparatus 10 receives the instruction of file system creation, the NAS apparatus 10 and the storage apparatus 20 execute a file system creation processing for the LU 271 ("5. file system creation processing" in FIG. 2). A file system creation program 1402 transmits a file system creation request to an I/O processing program 242.

If the I/O processing program 242 receives the file system creation request, the I/O processing program 242 issues a write processing (one of the I/O processing) for the LU 271 indicated by the administrator ("6. I/O issuance" in FIG. 2).

In FIG. 2, it becomes unnecessary that the administrator checks in advance whether or not the power status of the target LU is the spin-down or spin-down reserve, by displaying (or by not displaying) that the power status checking processing (see 2. in FIG. 2) and a part of the target LU list can not be selected.

Next, the storage system according to the first embodiment of the present invention will be explained in details.

Figure 3:
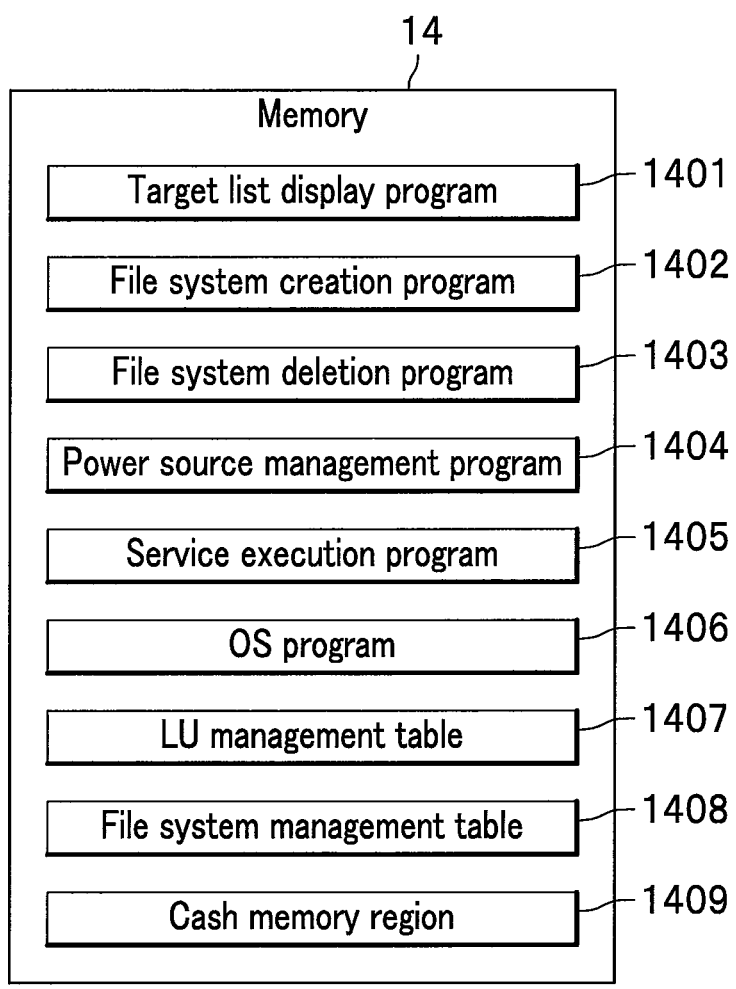
FIG. 3 is an illustration for explaining a function of a NAS apparatus according to the first embodiment of the present invention.

FIG. 3 is an illustration for explaining programs and data stored in the memory of the NAS apparatus for the purpose of explaining a function of the NAS apparatus according to the first embodiment of the present invention.

The NAS apparatus 10 includes, in a memory 14, the target list display program 1401, the file system creation program 1402, a file system deletion program 1403, a power source management program 1404, a service execution program 1405, an OS (Operating System) program 1406, an LU management table (utilization status management information) 1407, a file system management table 1408, and a cash memory region 1409.

The target list display program 1401 executes a processing for displaying a list of targets of the file system creation and file system deletion. In addition, the target list display program 1401 executes a processing so that a LU or file system consist of a disk device 29, where the power status is the spin-down or spin-down reserve, can not be selected as a target of the file system creation program 1402 or file system deletion program 1403, and displays the processing result.

The file system creation program 1402 executes a processing for writing a file system in the LU indicated by the administrator using the management console 30, that is, the processing for storing data managed by the file system in the indicated LU.

The file system deletion program 1403 executes a processing for deleting a file system with respect to the LU constituting the file system indicated by the administrator using the management console 30.

The power source management program 1404 communicates with the storage apparatus 20 by instruction of the administrator, or processing of the target list display program 1401, the file system creation program 1402, and the file system deletion program 1403, and executes a display and control of the power status of the disk device 29 by the management console 30.

The service execution program 1405 executes a file access service to be conducted by the NAS apparatus 10. The file access service includes, for example, a NFS (Network File System) and CIFS (Common Internet File System).

The OS program 1406 calls a program indicated by the administrator or CPU 12 at constant time intervals by checking a time using a timer 15, as well as executes an input/output processing using the file system. A program calling function at constant time intervals is a basic function provided in a typical OS program, such as Windows (registered trademark) and Linux (registered trademark). For example, Linux provides "Cron".

The LU management table 1407 is a table for managing a target LU to which the NAS apparatus 10 can issue the I/O processing. The table of the LU management table 1407 will be explained later in details.

The file system management table 1408 is a table for managing a file system created by the NAS apparatus 10. The table of the file system management table 1408 will be explained later in details.

The cash memory region 1409 in the memory 14 temporarily stores a file access service request from the computer 43 and the input/output processing such as write processing and read processing to and from the storage apparatus 20.

Figure 4:
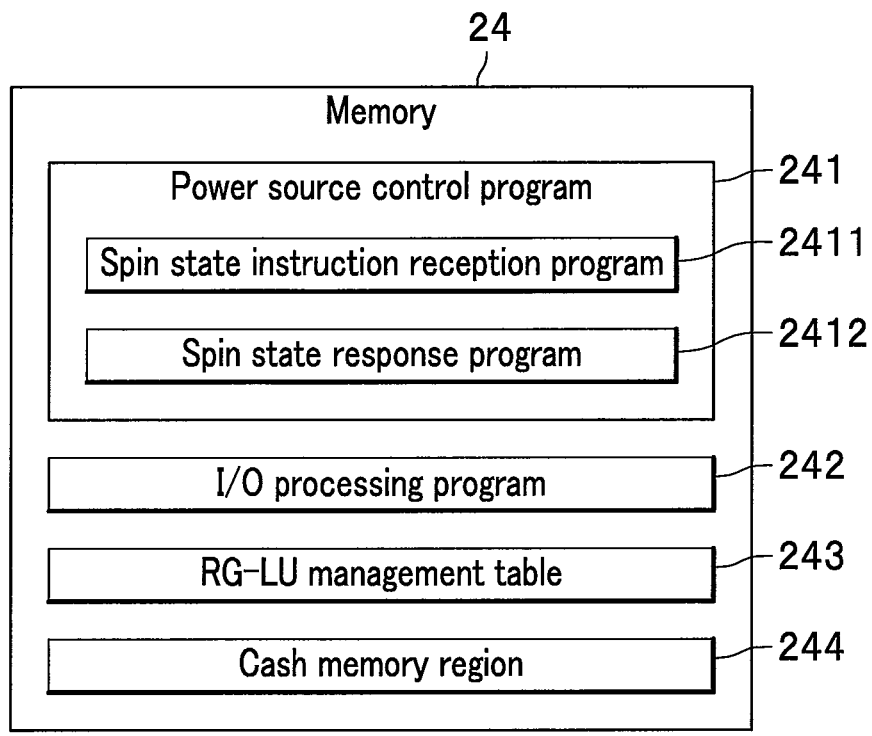
FIG. 4 is an illustration for explaining a function of a storage apparatus according to the first embodiment of the present invention.

FIG. 4 is an illustration for explaining programs and data stored in a memory of a storage apparatus for the purpose of explaining a function of the storage apparatus according to the first embodiment of the present invention.

The storage apparatus 20 includes, in a memory 24, a power source control program 241, an I/O processing program 242, a RG-LU management table (power state management information) 243, and a cash memory region 244.

The power source control program 241 controls the power status of the disk device 29 by instruction of the management console 30 or power source management program 1404. Examples of the power status are the spin-up, the spin-down, and the spin-down reserve. The spin-up is a state (normal state) of a fast rotation state of a disk, and receives the input/output processing such as read processing and write processing. The spin-down is the state of a slow rotation state (power saving state) of the disk, and does not receive the input/output processing such as read processing and write processing. The spin-down reserve is a state in which a part or all of LU created in the disk device 29 are instructed to be the spin-down (power saving state) and may be changed to the spin-down if a predetermined condition (described later) is satisfied. The spin-down reserve does not receive the input/output processing such as the read processing and the write processing. In addition, as another mode of the power status other then the spin-up and spin-down, for example, a power-off or rotation stop mode may be included.

The power source control program 241 includes a spin state instruction reception program 2411 and a spin state response program 2412.

The spin state instruction reception program 2411 controls a power status of the disk device 29 if the spin state instruction reception program 2411 receives an instruction for changing a power status from the management console 30 or power source management program 1404.

The spin state response program 2412 receives a power status checking instruction from the management console 30 or power source management program 1404, and sends back the power status of the disk device 29.

The I/O processing program 242 executes the input/output processing such as the write processing and the read processing to and from the disk device 29 by the instruction of the file system creation program 1402 or file system deletion program 1403.

The RG-LU management table 243 manages the RAID group 28 and LU 270.

The cash memory region 244 in the memory 24 temporarily stores a request from the NAS apparatus 10 and the input/output processing such as the write processing and read processing to and from the disk device 29.

Figure 5:
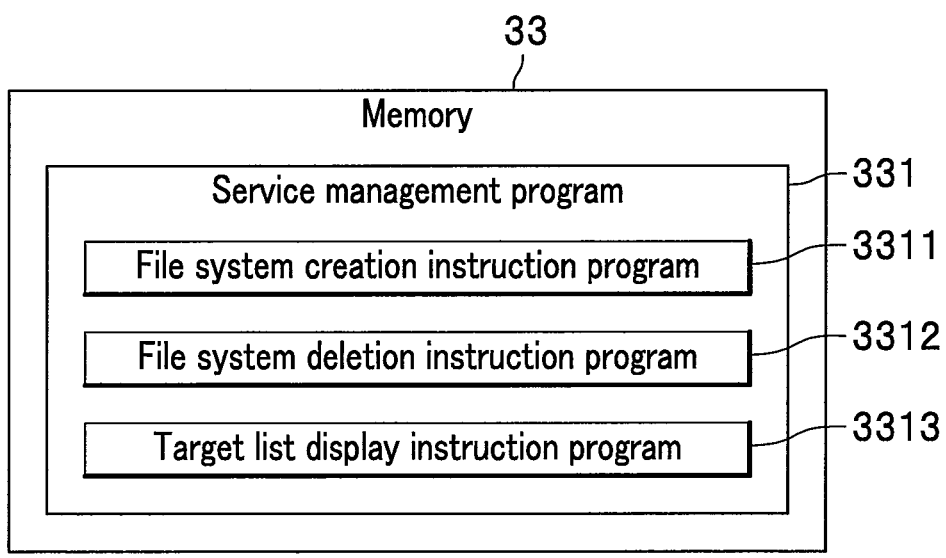
FIG. 5 is an illustration for explaining a function of a management console according to the first embodiment of the present invention.

FIG. 5 is an illustration for explaining programs stored in a memory of a management console for the purpose of explaining a function of the management console according to the first embodiment of the present invention.

The management console 30 includes a service management program 331 in a memory 33.

The service management program 331 instructs the NAS apparatus 10 based on the instruction of the administrator to display a list of file system creation, file system deletion, and processing target for achieving the service. The service management program 331 includes a file system creation instruction program 3311, a file system deletion instruction program 3312, and a target list display instruction program 3313.

The file system creation instruction program 3311 instructs the file system creation program 1402 to create a file system based on the instruction of the administrator.

The file system deletion instruction program 3312 instructs the file system deletion program 1403 to delete a file system based on the instruction of the administrator.

The target list display instruction program 3313 instructs the target list display program 1401 based on the instruction of the administrator to display a target list for selecting a target of file system creation or file system deletion, which is conducted by the administrator.

FIG. 6 is an illustration for explaining a configuration of a LU management table according to the first embodiment of the present invention.

The LU management table 1407 is a table for managing the LU 270. For example, the LU management table 1407 manages whether or not a file system is created in a LU to which the NAS apparatus 10 can issue the input/output processing such as the read processing and the write processing (that is, whether or not the LU is in-use).

A LUN (Logical Unit Number) field 14071 stores a unique ID (Identification), that is, the LUN assigned to each LU 270.

A LU name field 14072 stores a name of the LU 270 named by, for example, the administrator.

A utilization status field 14073 indicates whether or not a file system is created in the LU 270. If the file system is created in the LU 270, the utilization status field 14073 stores a value of "in-use", and if not, stores the value of "not in-use".

FIG. 7 is an illustration for explaining a configuration of a file system management table according to the first embodiment of the present invention.

The file system management table 1408 is a table for managing a file system and configuration thereof created in the past by the NAS apparatus 10.

A file system ID field 14081 stores a unique ID assigned to each file system.

A file system name 14082 stores a unique file system name assigned to the file system by, for example, the administrator.

A constituent LUN field 14083 stores a LUN of the LU 270 constituting the file system.

FIG. 8 is an illustration for explaining a configuration of a RG-LU management table according to the first embodiment of the present invention.

The RG-LU management table 243 is a table for managing a RAID group 28 and LU 270 which were created in the past by the storage apparatus 20, and configurations and power statuses thereof.

A RG-LU field 2431 stores a unique ID assigned to the RAID group 28.

A storage LUN field 2432 stores a unique ID assigned to the LU 270 in the storage apparatus 20.

A host LUN field 2433 stores a LUN of the LU 270 to be used by the NAS apparatus 10. The storage LUN and the host LUN are different kinds of LUN, and the NAS apparatus 10 can not use the storage LUN.

A power status field 2434 stores a power status of the LU 270.

Next, operations of a storage system according to the first embodiment of the present invention will be explained. The operations described hereinafter are executed as follows. Programs (processing unit) stored in a memory (storage unit) of each of the apparatuses such as the NAS apparatus 10, the storage apparatus 20, and the management console 30 are loaded on a memory region and executed by each CPU (control unit) of the apparatuses. Consequently, the operations are executed by each processing unit to be realized in each of the apparatus through the steps described above. In addition, each program maybe stored in advance in the storage unit, or maybe installed when needed via another storage media or communication media (network or carrier wave propagating the network).

Figure 9:
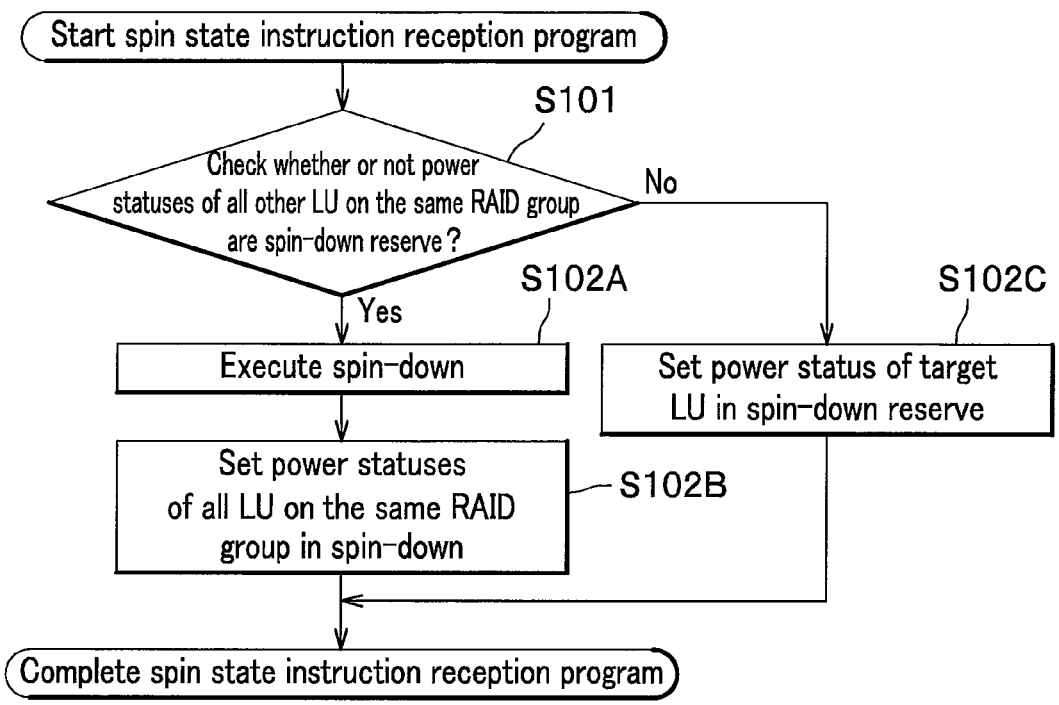
FIG. 9 is a flowchart showing a spin-down operation in a spin state instruction reception program of a storage apparatus according to the first embodiment of the present invention.

FIG. 9 is a flowchart showing a spin-down operation in a spin state instruction reception program of a storage apparatus according to the first embodiment of the present invention.

The spin state instruction reception program 2411 is executed at arbitrary timing by the instruction of the administrator to the power source management program 1404, or executed by the OS program 1406 according to a schedule set in advance by the administrator or an external system.

In the NAS apparatus 10, if the CPU 12, which executes the power source management program 1404, executes a spin-down instruction by indicating a target LU, the CPU 22 in the storage apparatus 20 executes the spin state instruction reception program 2411. It is noted that the target LU is in spin-up state.

First, in S101, the spin state instruction reception program 2411 checks whether or not power statuses of all other LU on the same RAID group with the target LU are spin-down reserve. The spin state instruction reception program 2411 reads the power status field 2434 of the RG-LU management table 243 with respect to the RAID group 28 to which the target LU belongs. If the power statuses of all other LU on the same RAID group with the target LU are the spin-down reserve (S101: Yes), the spin state instruction reception program 2411 moves to S102A, and if not (S101: No), moves to S102C.

Next, in S102A, the spin state instruction reception program 2411 executes the spin-down, and slows down rotation speeds of all disk devices 29 constituting the RAID group 28 including the target LU. If the spin-down is completed, the spin state instruction reception program 2411 moves to S102B.

Next, in S102B, the spin state instruction reception program 2411 sets the spin-down in a value of the power status 2434 of all LU created in the RAID group 28, in which the spin-down is completed, in the RG-LU management table 243, and completes the spin state instruction reception program 2411.

On the other hand, in S102C, the spin state instruction reception program 2411 sets the spin-down reserve in a value, that is, the power status, of the power status field 2434 of the target LU in the RG-LU management table 243, and completes the spin state instruction reception program 2411. In this case, the rotation speed of the disk is not slowed down actually.

Figure 10:
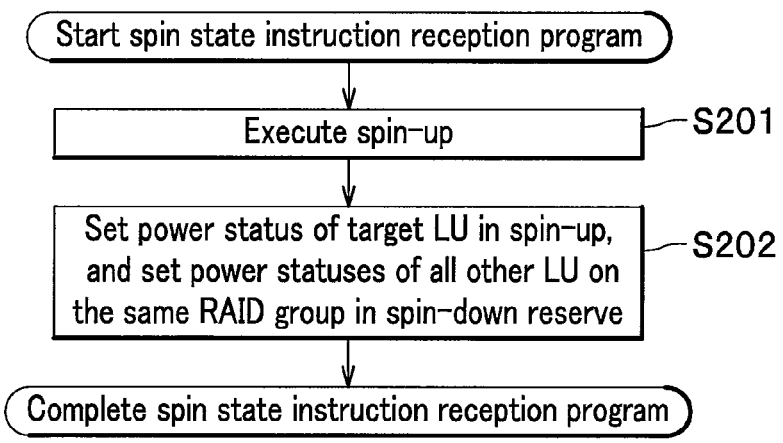
FIG. 10 is a flowchart showing a spin-up operation in a spin state instruction reception program of a storage apparatus according to the first embodiment of the present invention.

FIG. 10 is a flowchart showing a spin-up operation in the spin state instruction reception program 2411 of a storage apparatus according to the first embodiment of the present invention.

The spin state instruction reception program 2411 is executed at arbitrary timing by the administrator by utilizing the power source management program 1404, or by the OS program 1406 according to a schedule set in advance by the administrator or an external system.

In the NAS apparatus 10, if the CPU 12, which executes the power source management program 1404, executes the power source management program 1404 by indicating a target LU, the spin-up is instructed, and the CPU 22 in the storage apparatus 20 executes the spin state instruction reception program 2411. It is noted that the target LU is in the spin-down state.

First, in S201, the spin state instruction reception program 2411 executes the spin-up, and increases a rotation speed of the disk device 29 constituting the RAID group 28 including the target LU, and when the spin-up is completed, moves to S202.

Next, in S202, the spin state instruction reception program 2411 sets the spin-up in a value, that is, the power status, of the power status field 2434 of the target LU in the RG-LU management table 243, and sets the spin-down reserve in the power statuses of all other LU on the same RAID group, then, completes the spin state instruction reception program 2411.

Figure 11:
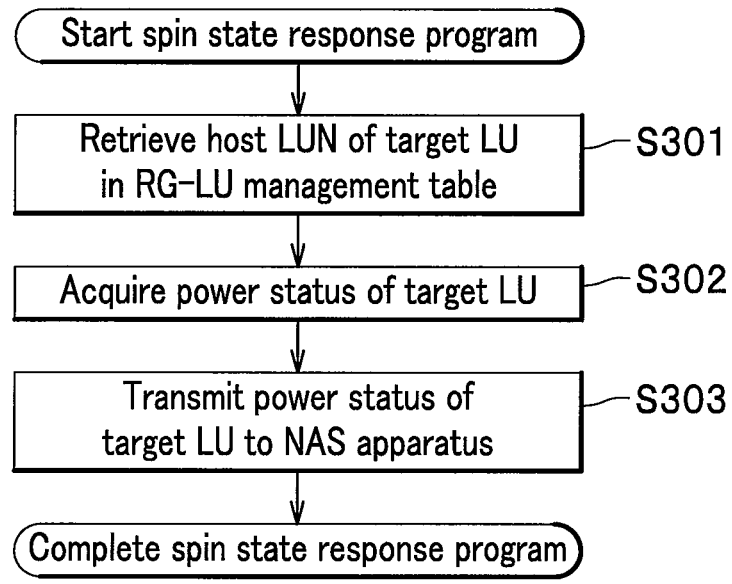
FIG. 11 is a flowchart showing an operation of a spin state response program of a storage apparatus according to the first embodiment of the present invention.

FIG. 11 is a flowchart showing an operation of a spin state response program of a storage apparatus according to the first embodiment of the present invention.

The spin state response program 2412 is executed at arbitrary timing for acquiring a power status of the target LU by utilizing the power source management program 1404 provided in the NAS apparatus 10. In addition, the spin state response program 2412 may be executed by the administrator by utilizing the target list display program 1401 provided in the NAS apparatus 10, or may be executed by the OS program 1406 according to a schedule set in advance by the administrator or an external system. Other than the power source management program 1404, there is a program, in the spin state response program 2412, which asks the storage apparatus 20 about a power status of the disk device 29. For example, the target list display program 1401, the file system creation program 1402, and the file system deletion program 1403 ask the storage apparatus 20 about the power status of the disk device. Operations of these programs will be explained later in details.

In the NAS apparatus 10, if the CPU 12 which executes the target list program 1401 executes the power source management program 1404, the CPU 22 which executes the spin state response program 2412 in the storage apparatus 20 executes the spin state response program 2412.

First, in S301, the spin state response program 2412 retrieves a host LUN of a target LU from the host LUN field 2433 of the RG-LU management table 243 by using a received LUN from the power source management program 1404, and if the retrieval is completed, moves to S302.

Next, in S302, the spin state response program 2412 acquires a power status of the target LU from the power status field 2434 of the RG-LU management table 243 by utilizing the acquired host LUN, and if the acquisition is completed, moves to S303.

Next, in S303, the spin state response program 2412 transmits the acquired power status to the power source management program 1404 of the NAS apparatus 10, and completes the spin state response program 2412.

As an example of application of the present embodiment, an operation of a storage system when an administrator creates or deletes a file system will be explained.

[Creation of File System]

First, an operation of the storage system when the administrator creates a file system will be explained.

Figure 12:
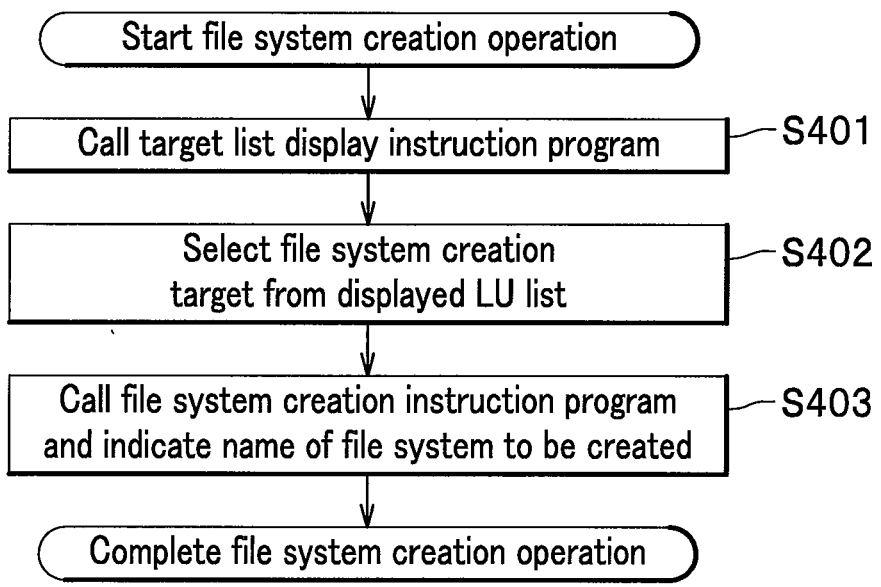
FIG. 12 is a flowchart showing a creation operation of an administrator when a file system is created according to the first embodiment of the present invention.

FIG. 12 is a flowchart showing a creation operation of an administrator when a file system is created according to the first embodiment of the present invention.

The administrator creates a file system by operating the management console 30.

First, in S401, the administrator calls the target list display instruction program 3313 for viewing a list of LU 270 which is a target of file system creation by using the display device 34. The target list display instruction program 3313 calls the target list display program 1401. The target list display program 1401 displays the list of LU 270 to be the target of the file system creation. Meanwhile, an operation of the target list display program 1401 in the file system creation operation will be described later in details.

Next, in S402, the administrator selects a target (file system creation target: target LU) of the file system creation from the displayed list of LU 270. Here, the file system creation target LU is not limited to one, but may be plural.

Next, in S403, the administrator calls the file system creation instruction program 3311 by indicating a name of the file system to be created. The file system creation instruction program 3311 calls the file system creation program 1402, and indicates the name of the file system to be created. Meanwhile, an operation of the file system creation program 1402 will be described later in details. If the file system creation program 1402 completes the processing, the file system creation instruction program 3311 completes the file system creation operation.

Figure 13:
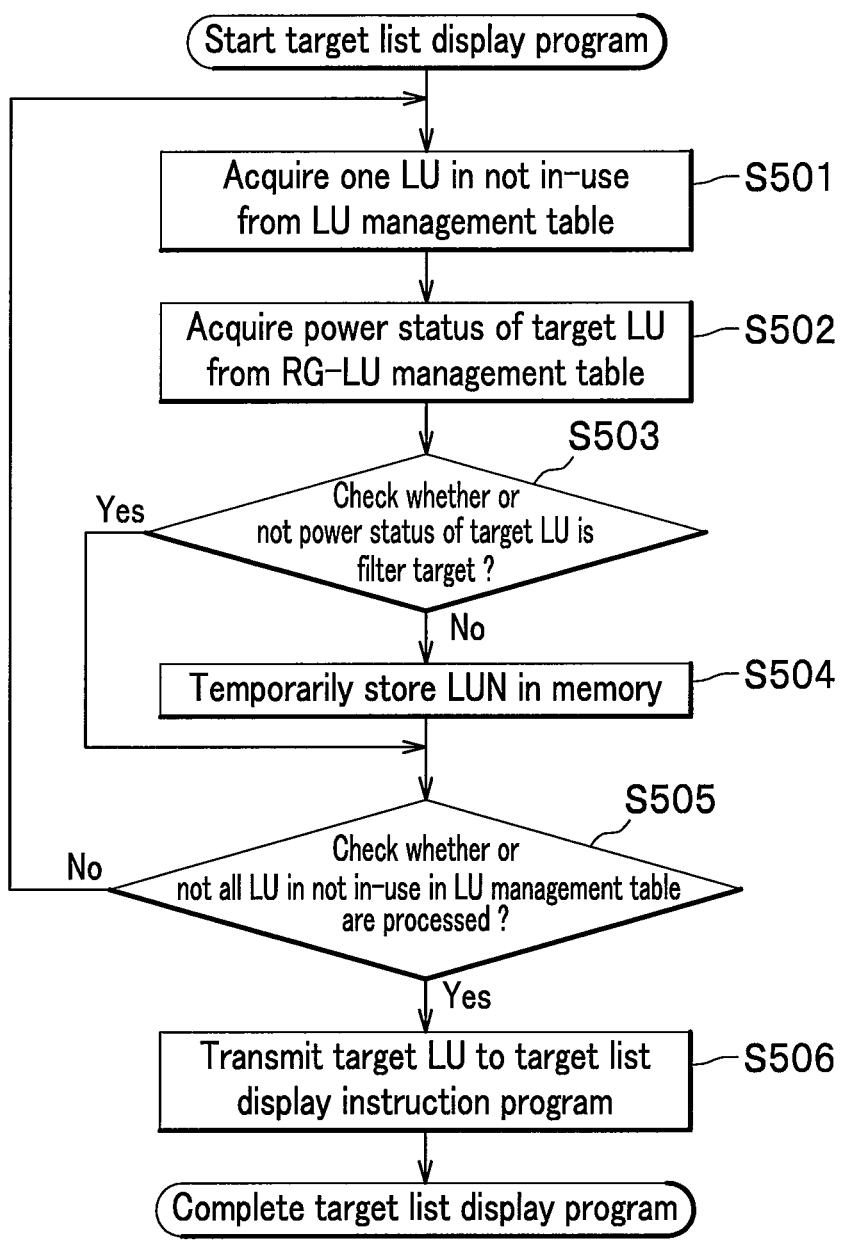
FIG. 13 is a flowchart showing an operation of a target list display program in a file system creation operation of a NAS apparatus according to the first embodiment of the present invention.

FIG. 13 is a flowchart showing an operation of a target list display program in a file system creation operation of a NAS apparatus according to the first embodiment of the present invention.

First, in S501, the target list display program 1401 acquires one LU (row) in which the utilization status field 14073 of the LU management table 1407 is not in-use, and moves to S502.

Next, in S502, the target list display program 1401 communicates with the spin state response program 2412, and acquires a power status of the target LU from the power status field 2434 of the RG-LU management table 243 by using a value, that is, the LUN (storage LUN), of the LUN field 14071 of the acquired LU, and moves to S503.

Next, in S503, the target list display program 1401 checks whether or not the acquired power status 2434 is a filter target, and if it is the filter target (S503: Yes), moves to S505, and if not (S503: No), moves to S504. Here, the filter target is a power status in which the target LU is not displayed in a file system creation target list in the later processing, and specifically indicates the spin-down and spin-down reserve. If there are many kinds of power statuses, a user may set the filter target. A correspondence relationship between the power status and the filter target is stored, for example, in the memory 14.

Next, in S504, the target list display program 1401 temporarily stores the LUN of the target by referring to the LU management table 1407 in the memory 14, and moves to S505.

Next, in S505, the target list display program 1401 checks whether or not all LU (LU in not use) which are not in-use in the utilization status field 14073 of the LU management table 1407 are processed completely, and if processed completely (S505: Yes), moves to S506, and if not (S505: No), returns to S501.

Next, in S506, the target list display program 1401 transmits the LU (target LU) which is identified by the LUN temporarily stored in the memory 14 to the target list display instruction program 3313 as a target candidate of the file system creation target, and completes the target list display program 1401. It is noted that at least the LUN is included in the target LU to be transmitted, and preferably a name of the LU is also included.

Figure 14:
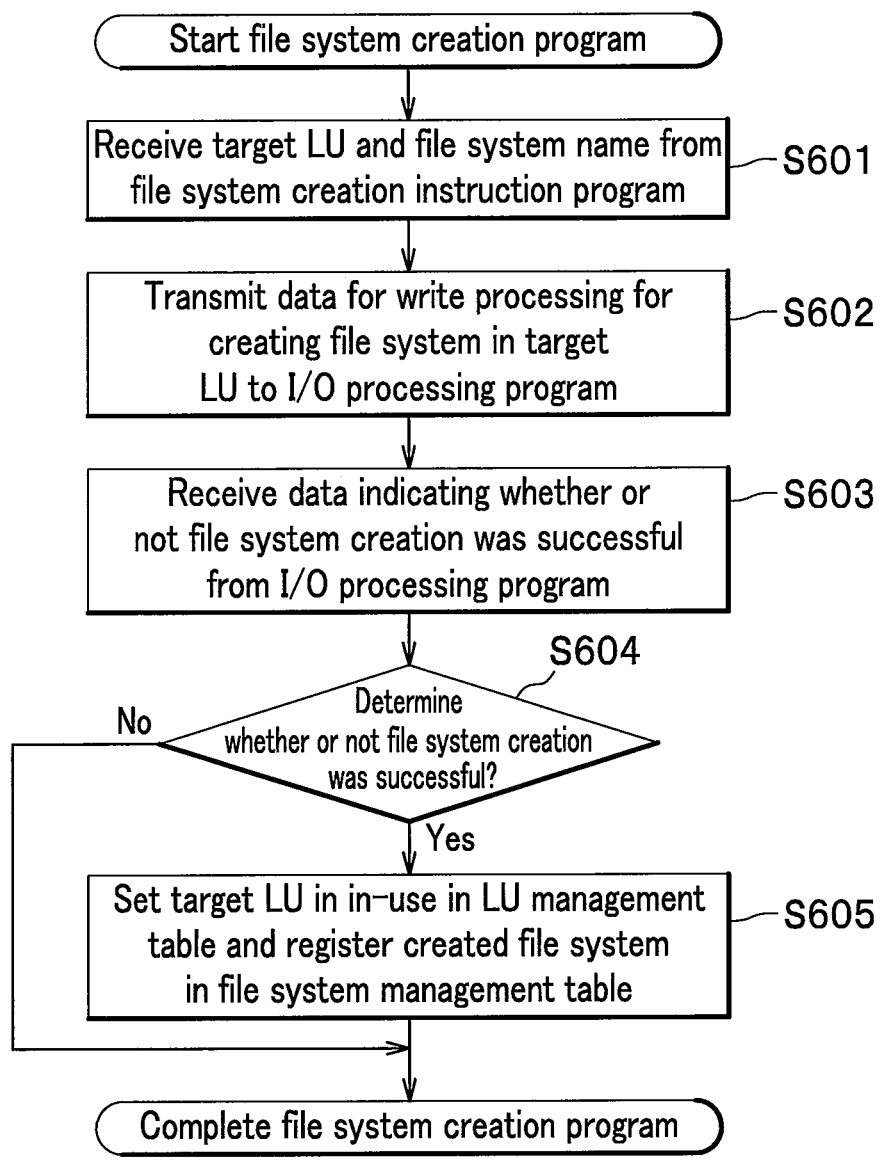
FIG. 14 is a flowchart showing an operation of a file system creation program of a NAS apparatus according to the first embodiment of the present invention.

FIG. 14 is a flowchart showing an operation of a file system creation program of a NAS apparatus according to the first embodiment of the present invention.

First, in S601, the file system creation program 1402 receives a target LU which is a file system creation target indicated by the administrator and a name (see S403) of the file system to be created from the file system creation instruction program 3311, and moves to S602.

Next, in S602, the file system creation program 1402 transmits data (data for write processing) for creating a file system in the LUN of the received target LU to the I/O processing program 242 of the storage apparatus 20, requests the input/output processing required for creating the file system, and moves to S603. The I/O processing program 242 writes the indicated data in the indicated LU as the write processing.

Next, in S603, the file system creation program 1402 receives data indicating whether or not the file system creation was successful from the I/O processing program 242, and moves to S604.

Next, in S604, the file system creation program 1402 determines whether or not the file system creation was successful based on the received data, and if successful (S604: Yes), moves to S605, and if not successful (S604: No), completes the file system creation processing.

Next, in S605, the file system creation program 1402 sets the target LU in-use in the utilization status field 14073 of the LU management table 1407. In addition, the file system creation program 1402 registers the created file system in the file system management table 1408. In other words, the file system creation program 1402 adds a new row in the file system management table 1408. In this case, an unregistered numerical number is stored in the file system ID field 14081, a name of the file system indicated by the administrator is stored in the file system name field 14082, and the LUN of the LU which is utilized in the file system is stored in the constituent LUN field 14083. Then, the file system creation program is completed.

Figure 15:
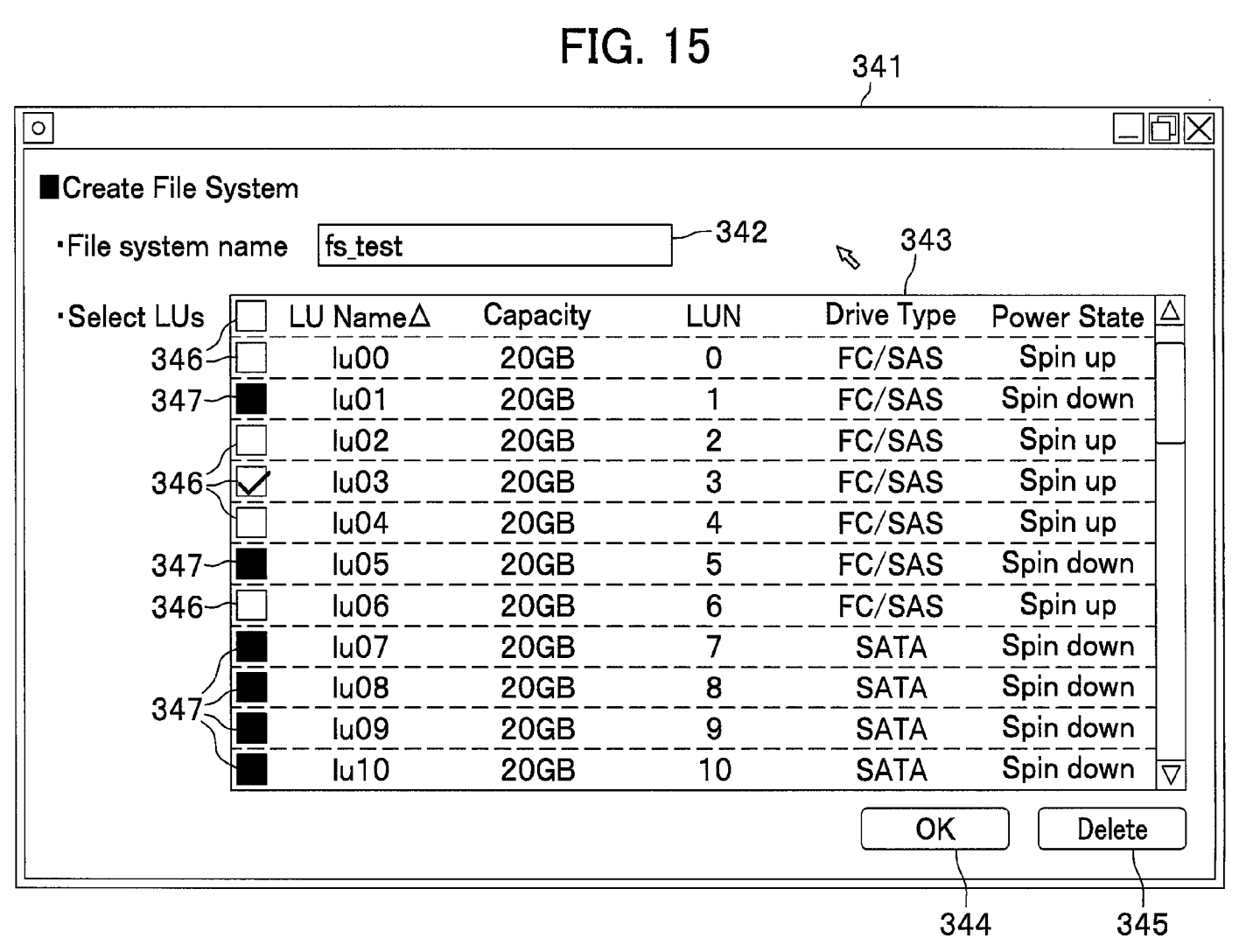

FIG. 15 is an example of a file system creation screen of a management console according to the first embodiment of the present invention.

First, a role of each component will be explained.

A file system name input field 342 is a box for inputting a name (File System Name) of a file system to be created by the administrator. A target LU input field (Select LUs) 343 is a box that the administrator selects a LU constituting the file system. As an example, the target LU input field 343 displays a name of LU (LU Name), a capacity (Capacity), a LUN, a type of disk drive (Drive Type), and a power status (Power State). A selectable box 346 is a box ("☐" in FIG. 15) of LU that the administrator can select as a file system creation target. A non-selectable box 347 is a box ("■" in FIG. 15) that the administrator can not select as the file system creation target. An "OK" button 344 is a button for executing a file system creation by using information input in the file system creation screen. A "Delete" button 345 is a button for deleting the file system creation. It is noted that in the embodiment, a logical volume other than the file system creation target is also displayed as a non-selectable. However, the present invention is not limited to this, and the logical volume other than the file system creation target may not be displayed.

In the management console 30, the administrator refers to the file system creation screen 341 displayed on the display device 34, and conducts the file system creation operation using the input device 35.

Next, an operation (file system creation operation) of an administrator when a file system is created will be explained.

The administrator operates to display the file system creation screen 341. When the file system creation screen 341 is displayed, the target list display instruction program 3313 is simultaneously called, and a list of LU which is a file system creation target is displayed in the target LU input filed 343. The administrator inputs a name ("fs_test" in FIG. 15) of a file system in the file system name input field 342, selects at least one in the target LU input field 343 (inputs checkmark in box 346 of LU whose name is "lu03" in FIG. 15), and pushes the OK button 344. When the administrator pushes the OK button 344, the file system creation screen 341 is closed and the file system creation instruction program is called, then, the processing for creating the file system starts.

[File System Deletion]

Next, an operation of a storage system when a file system is deleted by an administrator will be explained.

Figure 16:
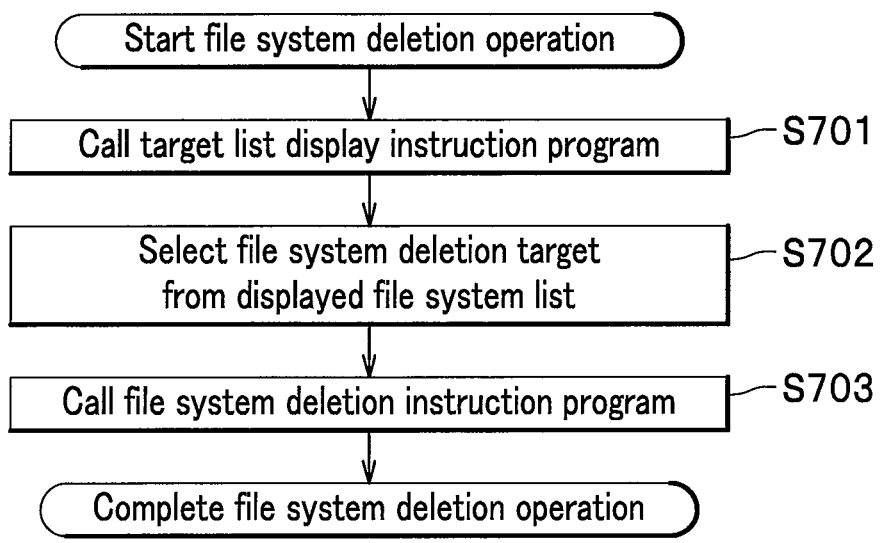
FIG. 16 is a flowchart showing an operation of an administrator when a file system is deleted according to the first embodiment of the present invention.

FIG. 16 is a flowchart showing an operation (file system deletion operation) of an administrator when a file system is deleted according to the first embodiment of the present invention.

The administrator deletes a file system by operating the management console 30.

First, in S701, the administrator calls the target list display instruction program 3313 for viewing a list of a file system which is a deletion target by the display device 34. The target list display instruction program 3313 calls the target list display program 1401. The target list display program 1401 displays the list of a deletion target file system, and moves to S702. It is noted that an operation of the target list display program 1401 in the file system deletion operation will be described later in details.

Next, in S702, the administrator selects a deletion target (file system deletion target: target file system) of file system from the list of the displayed file system, and moves to S703.

Next, in S703, the administrator calls the file system deletion instruction program 3312. The file system deletion instruction program 3312 calls the file system deletion program 1403. It is noted that an operation of the file system deletion program 1403 will be described later in details. When the processing of the file system deletion program 1403 is completed, the file system deletion instruction program 3312 completes the file system deletion operation.

Figure 17:
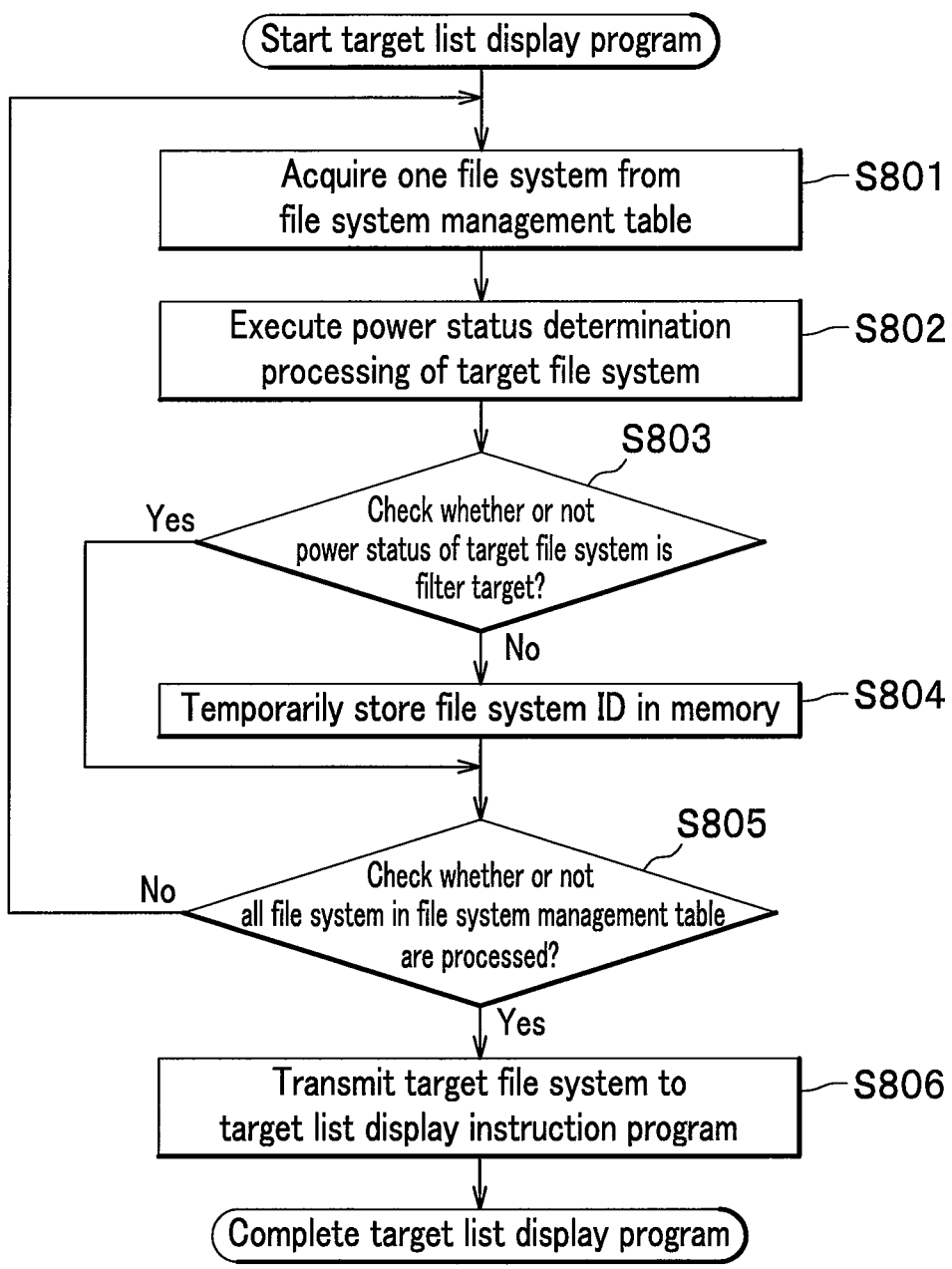
FIG. 17 is a flowchart showing an operation of a target list display program in a file system deletion operation of a NAS apparatus according to the first embodiment of the present invention.

FIG. 17 is a flowchart showing an operation of a target list display program in a file system deletion operation of a NAS apparatus according to the first embodiment of the present invention.

First, in S801, the target list display program 1401 acquires one file system (row) from the file system management table 1408, and moves to S802.

Next, in S802, the target list display program 1401 executes a determination processing of a power status of a target file system by using a value in the file system ID field 14081, that is, the file system ID, in the acquired file system. Here, the power status of the file system means the power status of the LU constituting the target file system. When the determination of the power status of the target file system is completed, the target list display program 1401 moves to S803. It is noted that the power status determination processing of the target file system will be described later in details.

Next, in S803, the target list display program 1401 checks whether or not the received power status is the filter target, and if it is the filter target (S803: Yes), moves to S805, and if not (S803: No), moves to S804.

Next, in S804, the target list display program 1401 temporarily stores a file system ID of the target file system in the memory 14, and moves to S805.

Next, in S805, the target list display program 1401 checks whether or not all file systems in the file system management table 1408 are processed, and if the all file system are processed (S805: Yes), moves to S806, and if not (S805: No), returns to S801.

Next, in S806, the target list display program 1401 transmits a file system (target file system) identified by the file system ID temporarily stored in the memory 14 to the target list display program 3313 as a target candidate of the file system deletion target, and completes the target list display program 1401. It is noted that in the target file system to be transmitted, at least the file system ID is included, and preferably, the file system name is also included.

Figure 18:
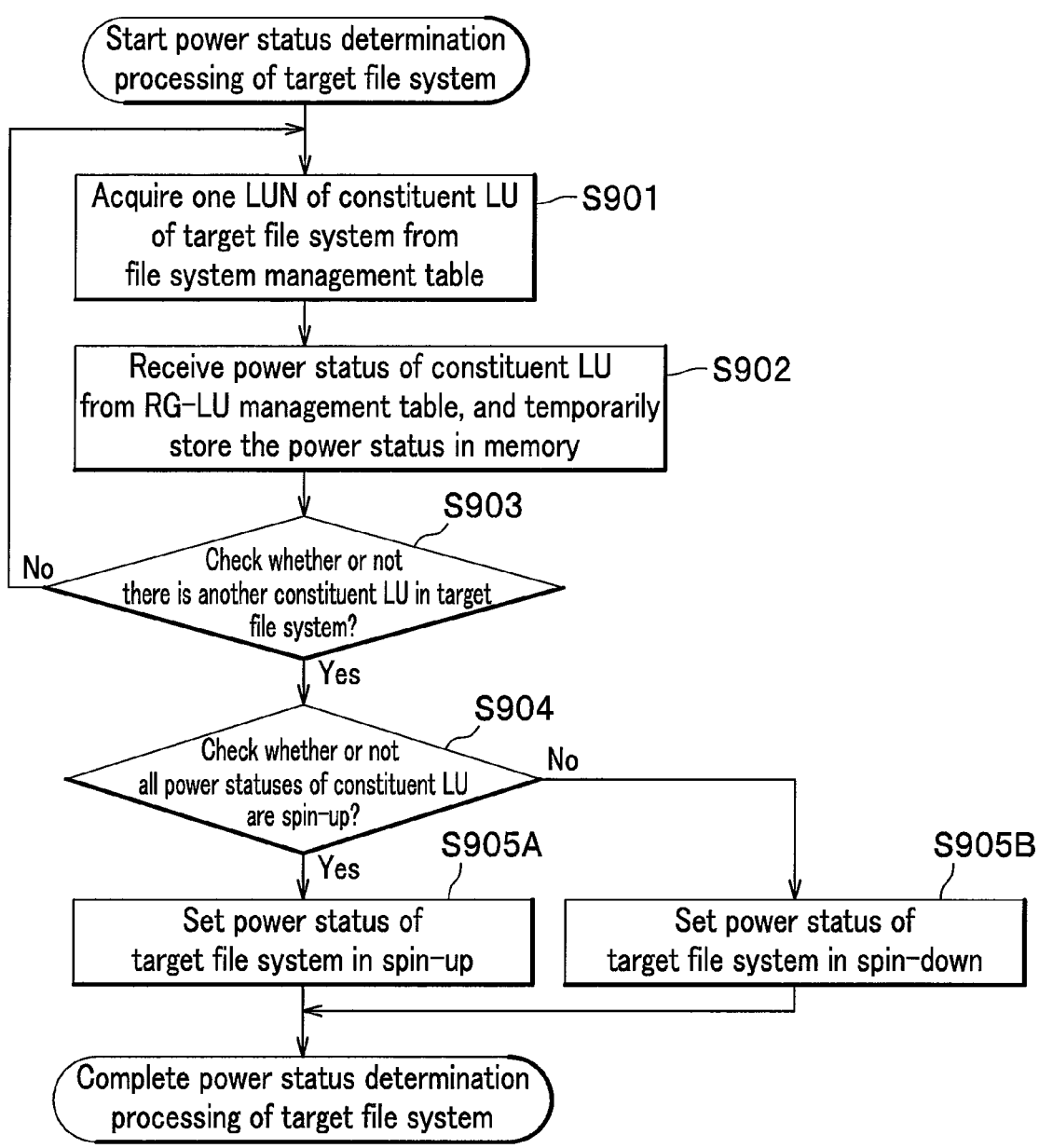
FIG. 18 is a flowchart showing a power status determination processing of a file system in a target list display program of a NAS apparatus according to the first embodiment of the present invention.

FIG. 18 is a flowchart showing a power status determination processing of a file system in a target list display program of a NAS apparatus according to the first embodiment of the present invention.

First, in S901, the target list display program 1401 acquires a LUN (constituent LUN) of a LU (constituent LU) constituting a target file system from the file system management table 1408 by using the file system ID of the acquired file system (see S801), and moves to S902. If there are a plurality of constituent LU, one LUN among the plurality of constituent LU is acquired, and the target list display program 1401 moves to S902.

Next, in S902, the target list display program 1401 communicates with the spin state response program 2412 to receive a power status of the constituent LU from the power status field 2434 of the RG-LU management table 243, and temporarily stores the power status in the memory 14, then, moves to S903.

Next, in S903, the target list display program 1401 refers to the file system management table 1408 and checks whether or not there is another constituent LU in the target file system, and if there is another constituent LU (S903: Yes), moves to S904, and if not (S903: No), returns to S901.

Next, in S904, the target list display program 1401 checks whether or not all power statuses of the constituent LU stored in the memory 14 are the spin-up, and if the all are the spin-up (S904: Yes), moves to S905A, and if not (S904: No), moves to S905B.

In S905A, the target list display program 1401 sets a power status of the target file system in the spin-up, and completes the power status determination processing of the file system.

In S905B, the target list display program 1401 sets the power status of the target file system in the spin-down, and completes the power status determination processing of the file system.

It is noted that a setting of a power status of a target file system may be performed, for example, by changing a value, that is, the power status, in the power status field 2434 corresponding to the constituent LU of the target file system in the RG-LU management table 243 of the storage apparatus 20. In addition, the setting of a power status of a target file system may be performed by adding a field for storing the power status of the file system in the file system management table 1408 of the NAS apparatus 10, and changing a value in the field. Further, the setting of a power status of a target file system may be performed by merely storing the power status of the target file system in the memory 14 during a period from completion of the checking in S904 to completion of the deletion of the file system.

Figure 19:
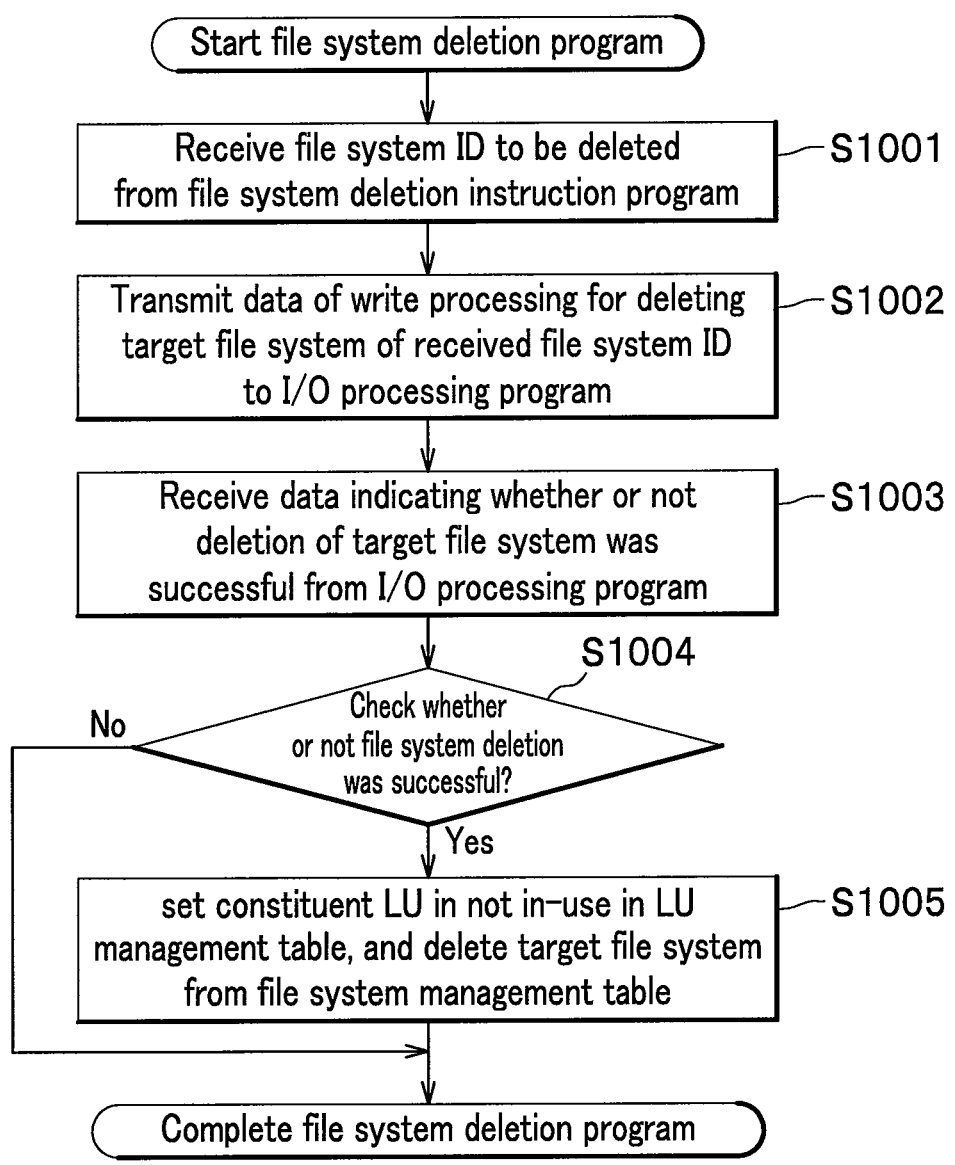
FIG. 19 is a flowchart showing an operation of a file system deletion program of a NAS apparatus according to the first embodiment of the present invention.

FIG. 19 is a flowchart showing an operation of a file system deletion program of a NAS apparatus according to the first embodiment of the present invention.

First, in S1001, the file system deletion program 1403 receives a file system ID of a deletion target file system indicated by the administrator from the file system deletion instruction program 3312, and moves to S1002.

Next, in S1002, the file system deletion program 1403 transmits data (data for write processing) for deleting the target file system of the received file system ID to the I/O processing program 242 of the storage apparatus 20 through the OS program 1406, requests the input/output processing required for deleting the file system, and moves to S1003. In this case, the OS program 1406 determines a LU, in which the data received by the storage apparatus 20 is written, from the file system management table 1408. The I/O processing program 242 writes the data indicated as the write processing by the file system deletion program 1403 in the LU indicated by the OS program 1406.

Next, in S1003, the file system deletion program 1403 receives data indicating whether or not the deletion of the target file system was successful from the I/O processing program 242, and moves to S1004.

Next, in S1004, the file system deletion program 1403 determines whether or not the file system deletion was successful from the received data, and if the file system deletion was successful (S1004: Yes), moves to S1005, and if not successful (S1004: No), completes the file system deletion processing.

Next, in S1005, the file system deletion program 1403 sets the constituent LU of the deletion target file system in not in-use in the utilization status field 14073 of the LU management table 1407. In addition, the file system deletion program 1403 deletes the row of the target file system from the file system management table 1408.

With the operations described above, the file system deletion processing is completed.

Effects in the first embodiment of the present invention will be explained.

In the first embodiment, when the administrator creates a file system, a LU which is the spin-down or spin-down reserve is set in unselectable at a management screen for selecting a target LU. Or, when the administrator deletes the file system, a LU which is the spin-down or spin-down reserve is set in unselectable at the management screen for selecting the target file system. Because the management console 30 displays the management screen as described above, the administrator can not select the LU which does not receive the write processing due to the spin-down or spin-down reserve, and as a result, the management operation can be easily conducted in two points. The first point is that whether the file system creation or deletion is possible or impossible can be determined by using only the management screen for selecting the target LU, it is unnecessary to check the power status of the target LU by another operation. The second point is that the administrator is prevented from failing the management operation which is caused by executing the file system creation operation or deletion operation for the LU of the spin-down or spin-down reserve.

In addition, a snapshot creation and deletion, and a file access service creation and deletion are examples of other embodiments of the present invention.

First, the snapshot creation and deletion will be explained.

The snapshot is an image which has a volume to store a file system at a given base point in time indicated by an administrator. The administrator instructs the NAS apparatus 10 and the storage apparatus 20 using the management console 30 to create the snapshot in advance as a backup for failures, and deletes the snapshot when it becomes unnecessary. In the snapshot creation and deletion, the NAS apparatus 10 and the storage apparatus 20 issue the write processing to the disk device 29 constituting a target file system. Therefore, if the administrator conducts the snapshot creation or deletion for the LU 270 where the power status is the spin-down or spin-down reserve, the operation will be failed. Here, as with the case of the file system creation or deletion, the administrator can determine whether the snapshot creation or deletion is possible or impossible by using only the management screen for selecting the target file system, by utilizing the target list display program 1401 described above, and can be prevented from failing the operation of the snapshot creation or deletion.

Accordingly, in the present invention, the management operation also can be easily conducted in the operation of the snapshot creation or deletion.

Next, the file access service creation and deletion will be explained.

The file access service is a service in which a file is shared among the computers 43 by using a protocol such as the NFS and CIFS described above. The administrator instructs the NAS apparatus 10 using the management console 30 to mount a file system created in advance on the computer 43, and operates the computer 43 to create the file access service. In addition, the administrator instructs the NAS apparatus 10 using the management console 30 to delete the file access service being served to the computer 43 and unmount the file system being served. However, if the administrator conducts the operation for creating or deleting the file access service on the LU where the power status is the spin-down or spin-down reserve, the creation or deletion of the file access service will be failed because the NAS apparatus 10 executes write processing when the target file system is mounted or unmounted.

Here, as with the case of the file system creation or deletion, the administrator can determine whether the creation or deletion of the file access service is possible or impossible by using only the management screen for selecting the target file access service, by utilizing the target list display program 1401 described above, and can be prevented from failing the operation of the creation or deletion of the file access service. Accordingly, in the present invention, the management operation also can be easily conducted in the operation of the creation or deletion of the file access service.

<<Second Embodiment>>

An operation of a storage system according to a second embodiment of the present invention will be explained. Here, differences from the first embodiment will be mainly explained, and an explanation on a feature in common with the first embodiment will be omitted or simplified. In addition, an identical constituent to the first embodiment will be labeled with the same symbol.

First, an operation summary of a storage system according to the second embodiment will be explained.

In the second embodiment, the administrator may select an LU where the power status is the spin-down or spin-down reserve in operation of the file system creation. If the administrator selects the LU where the power status is the spin-down or spin-down reserve, the file system creation program 1402 stores a content of processing for the LU in a delay execution management table (delay execution management information) 1410. A delay execution program 1411 provided in the NAS apparatus 10 checks whether the LU of spin-down turned to the spin-up or not at constant intervals, and executes processing stored in the delay execution management table 1410 for the spin-up LU which turned from the spin-down.

Figure 22:
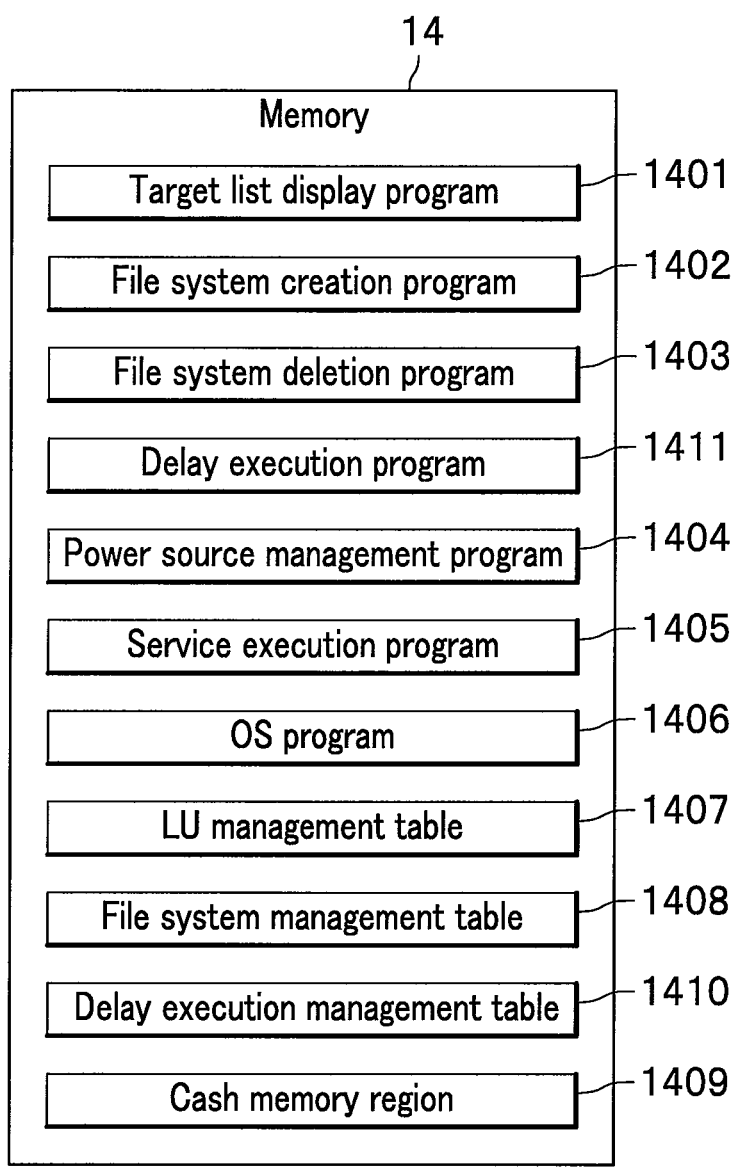
FIG. 22 is an illustration for explaining a function of a NAS apparatus according to the second embodiment of the present invention.

Next, a difference between the first embodiment and the second embodiment will be explained. The difference is a function provided in the NAS apparatus 10. FIG. 22 is an illustration for explaining a function of a NAS apparatus according to the second embodiment of the present invention. This NAS apparatus 10 includes the delay execution management table 1410 which stores a content of write processing executed on the LU of spin-down and the delay execution program 1411 which executes the content of processing stored in the delay execution management table 1410 after the target LU turned to the spin-up, as well as the functions included in the first embodiment shown in FIG. 3. In addition, an operation of the file system creation program 1402 among functions provided in the NSA apparatus 10 is different from that (see FIG. 14) of the first embodiment. Operations to be conducted by the administrator may be not only the file system creation operation, but also the file system deletion operation, as well as other service creations or deletions. Meanwhile, a content of the table and operation of the program will be explained later in details.

Next, a storage system according to the second embodiment of the present invention will be explained.

FIG. 20 is an illustration for explaining a configuration of a delay execution management table according to the second embodiment of the present invention.

The delay execution management table 1410 is a table for managing write processing to execute a delay. A job ID field 14101 stores a unique ID to be given for each write processing. A LUN field 14102 stores a LUN of LU which is a write processing target. A writing address field 14103 stores a writing address of the LU which is the writing processing target. A writing content data field 14104 stores a content which is written in the LU.

An operation of a file system creation program, which is not shown, according to the second embodiment of the present invention will be explained by referring to FIG. 14.

First, in S601, the file system creation program 1402 receives a target LU which is a file system creation target indicated by the administrator and a name (see S403) of the file system to be created from the file system instruction program 3311.

Then, the file system creation program 1402 communicates with the spin state response program 2412, and acquires the power status 2434 of the target LU from the RG-LU management table 243 by using a LUN of the received target LU.

Next, the file system creation program 1402 checks whether or not the acquired power status 2434 is the spin-up, and if the power status 2434 is the spin-up, moves to S602. After this, operations are executed through the end of FIG. 14 and the file system creation program 1402 is completed.

On the other hand, if the power status 2434 is not the spin-up, that is, if the power status 2434 is the spin-down or spin-down reserve, a content of write processing for creating a file system in the target LU is stored in the delay execution management table 1410. Namely, a new row is created at the bottom of the table, and a unique number which is not registered in the table is stored in the job ID field 14101, a LUN of the target LU is stored in the LUN field 14102, a writing address of the target LU is stored in the writing address field 14103, and a data of writing content is stored in the writing content data field 14104. Through the above operations, assuming that the file system creation was successful, the operation moves to S604. After this, operations are executed through the end of FIG. 14, and the file system creation program 1402 is completed.

Figure 21:
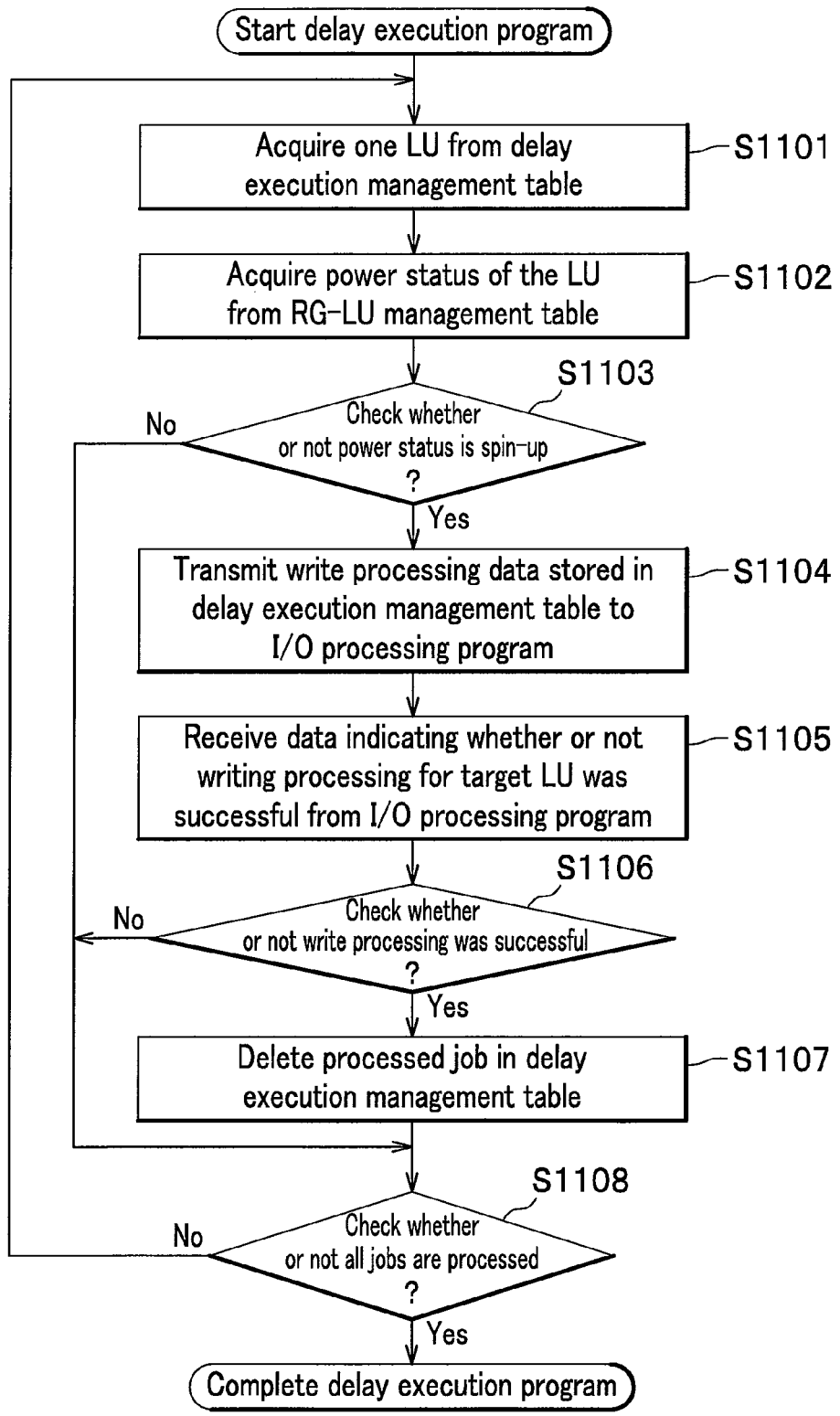
FIG. 21 is a flowchart showing an operation of a delay execution program according to the second embodiment of the present invention.

FIG. 21 is a flowchart showing an operation of a delay execution program according to the second embodiment of the present invention.

The delay execution program provided in the NAS apparatus 10 is called by the OS program 1406 to operate. An operating time may be determined, for example, by the OS program 1406, or may be set by the administrator.

First, in S1101, the delay execution program 1411 acquires one LUN stored in the LUN field 14102 of a job, for example, recoded in the uppermost row among non-processed jobs in the delay execution management table 1410, and moves to S1102 after the acquisition.

Next, in S1102, the delay execution program 1411 communicates with the spin state response program 2412 of the storage apparatus 24, and acquires a power status of LU having the LUN (storage LUN) by referring to the RG-LU management table, and moves to S1103 after the acquisition.

Next, in S1103, the delay execution program 1411 checks whether or not the acquired power status is the spin-up, and if the power status is the spin-up (S1103: Yes), moves to S1104, and if not (S1103: No, power status is spin-down or spin-down reserve in the embodiment), moves to S1108.

Next, in S1104, the delay execution program 1411 transmits a write processing data to the I/O processing program 242 so as to write the writing content data in the writing address registered in the delay execution management table 1410 with respect to the LU having the LUN, requests the input/output processing required for the file system creation (or deletion), and moves to S1105.

Next, in S1105, the delay execution program 1411 receives data indicating whether or not the write processing for the target LU was successful from the I/O processing program 242, and moves to S1106.

Next, in S1106, the delay execution program 1411 checks whether or not the write processing was successful based on the received data, and if the write processing was successful (S1106: Yes), moves to S1107, and if not (S1106: No), moves to S1108.

Next, in S1107, the delay execution program 1411 deletes all information of the processed jobs, that is, the jobs which were successful in the write processing, in the delay execution management table 1410, and moves to S1108.

Next, in S1108, the delay execution program 1411 checks whether or not all jobs in the delay execution management table 1410 are processed. If the all jobs are processed (S1108: Yes), that is, this means that there is no registered job in a row under the row of the job which is lately processed in the delay execution management table 1410, and the delay execution program is completed. If not (S1108: No), the operation returns to S1101.

With the descriptions described above, the explanation on the operation of the delay execution program ends.

Effects of the second embodiment will be explained.

In the second embodiment, when the administrator creates a file system, if a LU which is the spin-down or spin-down reserve is selected as a target, a content of file system creation processing is stored in a memory, and when the spin-up of the target LU is confirmed, the file system creation processing is executed. From the operations described above, the administrator can easily conduct the management operation in two points. The first point is that the administrator can complete the file system creation without checking the power status of the target LU. The second point is that the administrator is prevented from failing the management operation which is caused by executing the file system creation operation or deletion operation for the LU which is the spin-down or spin-down reserve.

A couple of embodiments of the present invention have been explained. However, the embodiments are examples for explaining the present invention and the extent of the present invention is not limited to these embodiments. The present invention may also be embodied in other embodiments.

For example, the following configuration may be conceivable. The configuration is such that when the administrator conducts the operation of the file system creation with a storage system, which is provided with a function to automatically turn to the spin-up when a LU of the spin-down is executed the input/output processing such as the read processing and write processing, the administrator can not select the LU as a target LU if a time until the file system creation program times-out the creation processing is longer than the time, which is input in advance by the administrator and practically necessary for turning to the spin-up, by comparing the two times.

In addition, in the embodiment, a box indicating selectable is displayed in a LU which is selectable by an administrator, that is, capable of creating a file system in the file system creation screen which is a management screen of the management console, and the box indicating unselectable is displayed in the LU which is unselectable by the administrator (see FIG. 15). However, the display style is not limited to this, and it is sufficient if the display style can send a message to the administrator that the administrator must not select the unselectable LU. The unselectable LU may be displayed by, for example, emphasizing the unselectableness using a strikethrough and the like, or by not displaying the unselectable LU.

In the embodiment, the explanation has been made such that a LU is displayed on the management screen in the file system creation, and a file system is displayed on the management screen in the file system deletion. However, a file system which is deletable and selectable and a file system which is undeletable and unselectable may be both displayed on the management screen in executing the file system deletion. In addition, the undeletable file system may be emphasized by using the strike-through and the like, and only the deletable file system may be displayed.

It is noted that the administrator can surely change a file system including the file system creation and deletion using the management console.

Other than those above, a specific configuration such as hardware, software, each table, and each flowchart may be changed as appropriate without departing from a scope of the present invention.

[Industrial Applicability]

The present invention can widely be applied to a server providing a file sharing capabilities by using a storage apparatus which is provided with a power saving function.

What is claimed is:

1. A storage system, comprising:

a storage apparatus comprising a plurality of physical storage devices constituting a RAID group including a plurality of logical volumes, a storage unit of the storage apparatus storing power status management information indicating power statuses of the plurality of the logical volumes, and a control unit of the storage apparatus for controlling the power statuses of the plurality of the logical volumes in at least a normal state or a power saving state;

a file server comprising a control unit of the file server for processing a file system which is defined by the plurality of the logical volumes and manages data to be stored in the plurality of the logical volumes, and a storage unit of the file server for storing utilization status management information indicating utilization statuses of the plurality of the logical volumes; and a management computer which instructs the file server to create the file system according to identification information of a logical volume which is capable of creating the file system, wherein the control unit of the file server included in the file server transmits the identification information of the logical volume which is capable of creating the file system to the management computer, the identification information being determined based on the power statuses of the plurality of the logical volumes included in the power status management information acquired from the storage apparatus and the utilization statuses of the plurality of the logical volumes included in the utilization status management information, wherein the management computer comprises a display device of the management computer which displays the logical volume which is capable of creating the file system as selectable and displays the logical volume which is not capable of creating the file system as unselectable or displays nothing, based on the received identification information, wherein storage unit of the storage apparatus stores a RAID group logical unit (LU) management table which stores in corresponding relation with respect to each logical unit a RAID group ID, a storage logical unit number (LUN), a Host LUN and said power status information, wherein the storage unit of the file server stores a LU management table which stores in corresponding relation with respect to each logical unit a LUN, LUN name and said utilization status management information, wherein the power status of a logical volume is determined based on said power status information of said RAID group LU management table, and wherein said management computer instructs the file server to create the file system according to utilization indicated by said utilization status management information.

2. The storage system according to claim 1, wherein the control unit of the file server determines that the logical volume whose power status is in a power saving state is the logical volume which is not capable of creating the file system.

3. The storage system according to claim 1, wherein the control unit of the file server determines that the logical volume whose power status is a normal state and whose utilization status is not in-use indicating that the file system is not created is the logical volume which is capable of creating the file system.

4. The storage system according to claim 1, wherein the storage unit of the file server stores delay execution management information in which a job to be required for creating the file system, a logical volume whose power status is in the power saving state among the logical volumes constituting the created file system, and data to be managed by the created file system are related to each other; and wherein the control unit of the file server, when the power status of the selected logical volume is in the power saving status in the management computer, creates the delay execution management information and stores the delay execution management information in the storage unit of the file server, and if the logical volume included in the power status management information acquired from the storage apparatus turned to the normal state from the power saving state, creates the file system, and transmits the data to be managed by the created file system included in the delay execution management information to the storage apparatus.

5. The storage system according to claim 1, wherein the physical storage device is a disk device;

wherein the power status of the logical volume includes a spin-up state which is the normal state and in which a disk of the physical storage device constituting the logical volume rotates with a speed which is capable of input/output processing of the logical volume, a spin-down state which is the power saving state and in which the disk of the physical storage device constituting the logical volume rotates with a speed which is not capable of input/output processing of the logical volume, and a spin-down reserve state which is the power saving state and in which the disk of the physical storage device constituting the logical volume rotates with a speed which is capable of input/output processing of the logical volume although the logical volume is instructed spin-down; and wherein when the control unit of the storage apparatus acquires a spin-up instruction for the logical volume from the file server, the control unit of the storage apparatus sets the logical volume in the spin-up state and sets power statuses of other logical volumes on the RAID group in which the logical volume is included in the spin-down reserve state.

6. The storage system according to claim 1, wherein the physical storage device is a disk device;

wherein the power status of the logical volume includes a spin-up state which is the normal state and in which a disk of the physical storage device constituting the logical volume rotates with a speed which is capable of input/output processing of the logical volume, a spin-down state which is the power saving state and in which the disk of the physical storage device constituting the logical volume rotates with a speed which is not capable of input/output processing of the logical volume, and a spin-down reserve state which is the power saving state and in which the disk of the physical storage device constituting the logical volume rotates with a speed which is capable of input/output processing of the logical volume although the logical volume is instructed spin-down; and wherein when the control unit of the storage apparatus acquires a spin-up instruction for the logical volume from the file server, if all power statuses of other logical volumes on the RAID group including the logical volume are the spin-down reserve, the control unit of the storage apparatus sets all power statuses of the logical volumes on the RAID group in the spin-down state, and if the all power statuses of the other logical volumes on the RAID group including the logical volume are not the spin-down reserve, the control unit of the storage apparatus sets the power status of the logical volume in the spin-down reserve state.

7. The storage system according to claim 1, wherein the storage unit of the file server further stores file system management information which indicates the logical volume defining the file system; and wherein when a logical volume which is a target of the file system is selected, the control unit of the file server requires input/output processing necessary for creating the file system consist of the logical volume which is selected in the management computer of the storage apparatus, and registers file system management information of the file system consist of the logical volume which is selected in the management computer in the storage unit of the file server.

8. A file system management method using a storage system which comprises:

a storage apparatus comprising a plurality of physical storage devices constituting a RAID group including a plurality of logical volumes, a storage unit of the storage apparatus storing power status management information indicating power statuses of the plurality of the logical volumes, and a control unit of the storage apparatus for controlling the power statuses of the plurality of the logical volumes in at least a normal state or power saving state;

a file server comprising a control unit of the file server for processing a file system which is defined by the plurality of the logical volumes and manages data to be stored in the plurality of the logical volumes, and a storage unit of the file server for storing utilization status management information indicating utilization statuses of the plurality of the logical volumes; and a management computer which instructs the file server to create the file system according to identification information of a logical volume which is capable of creating the file system, the file system management method comprising steps of:

transmitting, by the control unit of the file server included in the file server, the identification information of the logical volume which is capable of creating the file system, the identification information being determined based on the power statuses of the plurality of the logical volumes included in the power status management information acquired from the storage apparatus and the utilization statuses of the plurality of the logical volumes included in the utilization status management information; and displaying, by a display device of the management computer, the logical volume which is capable of creating the file system as selectable and displaying the logical volume which is not capable of creating the file system as unselectable or displaying nothing, based on the received identification information, wherein storage unit of the storage apparatus stores a RAID group logical unit (LU) management table which stores in corresponding relation with respect to each logical unit a RAID group ID, a storage logical unit number (LUN), a Host LUN and said power status information, wherein the storage unit of the file server stores a LU management table which stores in corresponding relation with respect to each logical unit a LUN, LUN name and said utilization status management information, wherein the power status of a logical volume is determined based on said power status information of said RAID group LU management table, and wherein said management computer instructs the file server to create the file system according to utilization indicated by said utilization status management information.

9. The file system management method according to claim 8, wherein the control unit of the file server determining that the logical volume whose power status is in a power saving state is the logical volume which is not capable of creating the file system.

10. The file system management method according to claim 8, wherein the control unit of the file server determining that the logical volume whose power status is a normal state and whose utilization status is not in-use indicating that the file system is not created is the logical volume which is capable of creating the file system.

11. The file system management method according to claim 8, wherein the storage unit of the file server storing delay execution management information in which a job to be required for creating the file system, a logical volume whose power status is in the power saving state among the logical volumes constituting the created file system, and data to be managed by the created file system are related to each other; and wherein the control unit of the file server, when the power status of the selected logical volume is in the power saving status in the management computer, creating the delay execution management information and storing the delay execution management information in the storage unit of the file server, and if the logical volume included in the power status management information acquired from the storage apparatus turned to the normal state from the power saving state, creating the file system, and transmitting the data to be managed by the created file system included in the delay execution management information to the storage apparatus.

12. The file system management method according to claim 8, wherein the physical storage device is a disk device; wherein the power status of the logical volume including a spin-up state which is the normal state and in which a disk of the physical storage device constituting the logical volume rotates with a speed which is capable of input/output processing of the logical volume, a spin-down state which is the power saving state and in which the disk of the physical storage device constituting the logical volume rotates with a speed which is not capable of input/output processing of the logical volume, and a spin-down reserve state which is the power saving state and in which the disk of the physical storage device constituting the logical volume rotates with a speed which is capable of input/output processing of the logical volume although the logical volume is instructed spin-down; and wherein when the control unit of the storage apparatus acquires a spin-up instruction for the logical volume from the file server, the control unit of the storage apparatus setting the logical volume in the spin-up state and setting power statuses of other logical volumes on the RAID group in which the logical volume is included in the spin-down reserve state.

13. The file system management method according to claim 8, wherein the physical storage device is a disk device;

wherein the power status of the logical volume including a spin-up state which is the normal state and in which a disk of the physical storage device constituting the logical volume rotates with a speed which is capable of input/output processing of the logical volume, a spin-down state which is the power saving state and in which the disk of the physical storage device constituting the logical volume rotates with a speed which is not capable of input/output processing of the logical volume, and a spin-down reserve state which is the power saving state and in which the disk of the physical storage device constituting the logical volume rotates with a speed which is capable of input/output processing of the logical volume although the logical volume is instructed spin-down; and wherein when the control unit of the storage apparatus acquires a spin-up instruction for the logical volume from the file server, if all power statuses of other logical volumes on the RAID group including the logical volume are the spin-down reserve, the control unit of the storage apparatus setting all power statuses of the logical volumes on the RAID group in the spin-down state, and if the all power statuses of the other logical volumes on the RAID group including the logical volume are not the spin-down reserve, the control unit of the storage apparatus setting the power status of the logical volume in the spin-down reserve state.

14. The file system management method according to claim 8, wherein the storage unit of the file server further storing file system management information which indicates a logical volume defining the file system; and wherein when a logical volume which is a target of the file system is selected, the control unit of the file server requiring input/output processing necessary for creating the file system consist of the logical volume which is selected in the management computer of the storage apparatus, and registering file system management information of the file system consist of the logical volume which is selected in the management computer in the storage unit of the file server.

15. A storage system, comprising:

a storage apparatus comprising a plurality of disk devices constituting a RAID group including a plurality of LU, a memory of the storage apparatus storing a RG-LU management table indicating power statuses of the plurality of the LU, and a CPU of the storage apparatus which sets the power statuses of the plurality of the LU in at least a spin-up state, spin-down state, or spin-down reserve state;

a NAS apparatus comprising a CPU of the NAS apparatus for processing a file system which is defined by the plurality of the LU and manages data to be stored in the plurality of the LU, and a memory of the NAS apparatus for storing a LU management table indicating utilization statuses of the plurality of the LU; and a management console which instructs the NAS apparatus to create the file system according to identification information of a LU which is capable of creating the file system, wherein the CPU of the NAS apparatus included in the NAS apparatus transmits the identification information of the LU which is capable of creating the file system to the management console, the identification information being determined based on the power statuses of the plurality of the LU included in the RG-LU management table acquired from the storage apparatus and the utilization statuses of the plurality of the LU included in the RG-LU management table;

wherein the management console comprises a display device of the management console which displays the LU which is capable of creating the file system as selectable and displays the LU which is not capable of creating the file system as unselectable or displays nothing, based on the received identification information;

wherein the CPU of the NAS apparatus determines that the LU whose power status is in the spin-down state or spin-down reserve state is the LU which is not capable of creating the file system, and that the LU whose power status is the spin-up state and whose utilization status is not in-use indicating that the file system is not created is the LU which is capable of creating the file system;

wherein the memory of the NAS apparatus further stores file system management information which indicates the LU defining the file system; and wherein when a LU which is a target of the file system is selected, the CPU of the NAS apparatus requires input/output processing necessary for creating the file system consist of the LU which is selected in the management console of the storage apparatus, and registers a file system management table of the file system consist of the LU which is selected in the management console in the memory of the NAS system, wherein said RG-LU management table stores in corresponding relation with respect to each logical unit a RAID group ID, a storage logical unit number (LUN), a Host LUN and said power status information, wherein said LU management table stores in corresponding relation with respect to each logical unit a LUN, LUN name and said utilization status management information, wherein the power status of a logical volume is determined based on said power status information of said RAID group LU management table, and wherein said management computer instructs the file server to create the file system according to utilization indicated by said utilization status management information.

* * * * *